(12) United States Patent
Yokoyama et al.

(10) Patent No.: US 8,185,296 B2
(45) Date of Patent: May 22, 2012

(54) DRIVING ASSISTING APPARATUS AND DRIVING ASSISTING METHOD

(75) Inventors: Akihisa Yokoyama, Susono (JP);
Takeshi Matsumura, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 550 days.

(21) Appl. No.: 12/443,616

(22) PCT Filed: Oct. 2, 2008

(86) PCT No.: PCT/JP2008/067960
§ 371 (c)(1),
(2), (4) Date: Apr. 17, 2009

(87) PCT Pub. No.: WO2009/048015
PCT Pub. Date: Apr. 16, 2009

(65) Prior Publication Data
US 2010/0004839 A1    Jan. 7, 2010

(30) Foreign Application Priority Data

Oct. 11, 2007  (JP) ................ P2007-265790
Jun. 23, 2008  (JP) ................ P2008-163539

(51) Int. Cl.
*G06G 7/76* (2006.01)
*G08G 1/00* (2006.01)
(52) U.S. Cl. ............ 701/117; 701/118; 701/119
(58) Field of Classification Search ......... 701/117–119, 701/70; 340/933–936, 901–910
See application file for complete search history.

(56) References Cited

U.S. PATENT DOCUMENTS 7,495,579 B2 * 2/2009 Sirota et al. .......... 340/907

FOREIGN PATENT DOCUMENTS

| JP | A-11-250399 | 9/1999 |
|---|---|---|
| JP | A-2001-236600 | 8/2001 |
| JP | A-2005-147884 | 6/2005 |
| JP | A-2006-058100 | 3/2006 |
| JP | A-2006-072936 | 3/2006 |
| JP | A-2006-139707 | 6/2006 |
| JP | A-2006-163534 | 6/2006 |
| JP | A-2007-164439 | 6/2007 |

OTHER PUBLICATIONS

May 11, 2010 International Preliminary Report on Patentability issued in International Application No. PCT/JP2008/067960.
Japanese Office Action dated Dec. 7, 2010 in corresponding Japanese Application No. 2009-016820 (with translation).

* cited by examiner

*Primary Examiner* — Yonel Beaulieu
(74) *Attorney, Agent, or Firm* — Oliff & Berridge, PLC

(57) ABSTRACT

A driving assisting apparatus and driving assisting method for predicting the state of a traffic light at the time when a vehicle enters an intersection includes predicting vehicle speed change of a vehicle in front of an intersection. The driving assisting apparatus and driving assisting method predicts the traffic light state when the vehicle enters the intersection according to the predicted vehicle speed change, while predicting the vehicle speed change according to stored driver characteristic information concerning the past vehicle speed change in front of the intersection with running environments, or changes a predicting method depending on whether or not the vehicle is positioned in front of a predetermined area set in front of the intersection.

12 Claims, 17 Drawing Sheets

*Fig.16*

| PREDICTED REMAINING DISTANCE AND PREDICTED VEHICLE SPEED | CALL FOR ATTENTION | |
|---|---|---|
| | TIMING | CONTENT |
| A | WHEN PASSING ATTENTION CALLING BOUNDARY | BEWARE: TRAFFIC LIGHT IS TURNING RED |
| B | WHEN PASSING STOPPABLE BOUNDARY | PLEASE DECELERATE: TRAFFIC LIGHT IS TURNING RED |
| C | WHEN RECEIVING OPTICAL BEACON | BEWARE OF TRAFFIC LIGHT ! |
| D | WHEN TRAFFIC LIGHT TURNS YELLOW | TRAFFIC LIGHT IS SOON TO TURN RED |

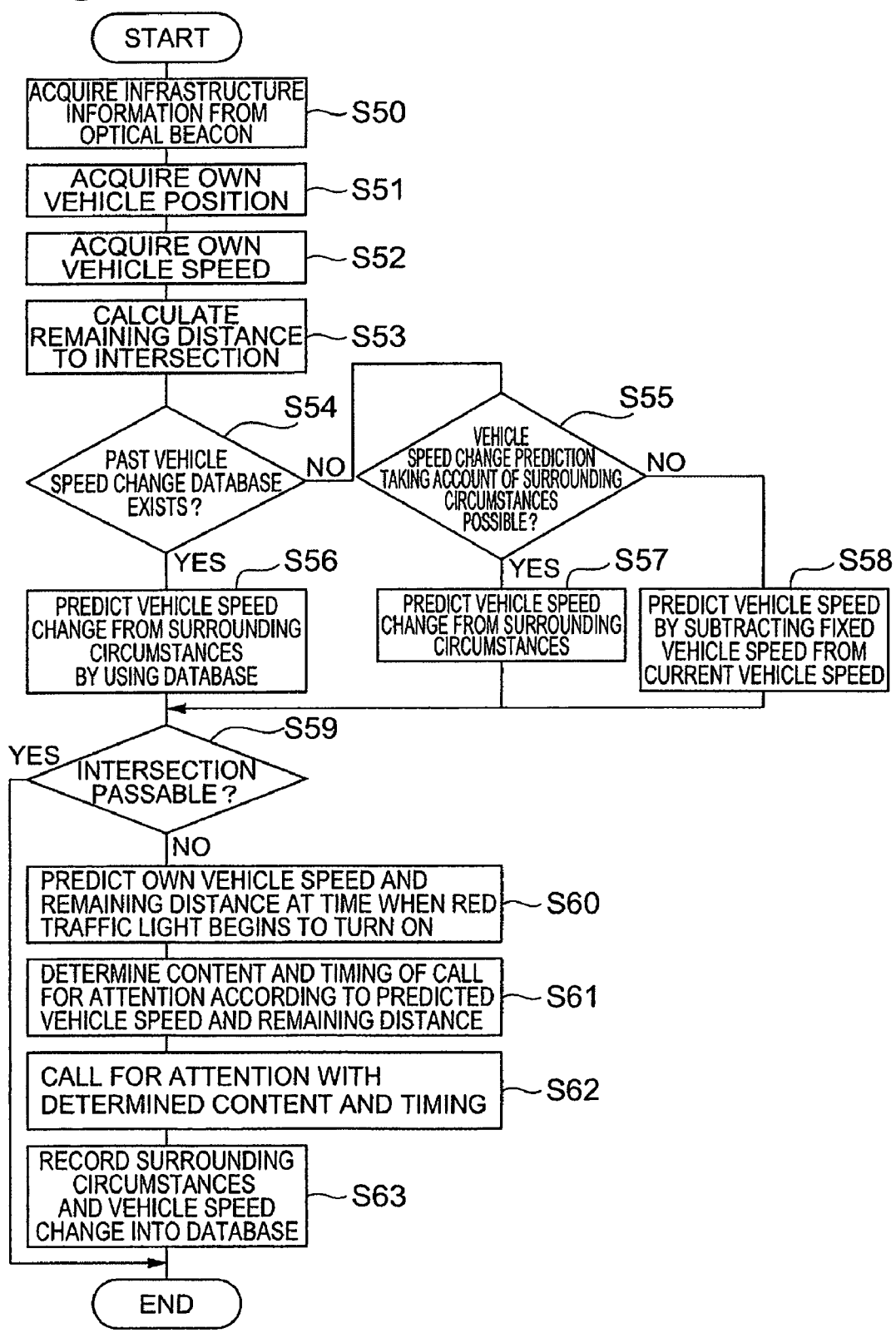

DRIVING ASSISTING APPARATUS AND DRIVING ASSISTING METHOD

TECHNICAL FIELD

The present invention relates to a driving assisting apparatus and driving assisting method for predicting the state of a traffic light at the time when a vehicle enters an intersection.

BACKGROUND ART

Driving assisting apparatus include those which issue warnings to a drivers automatically brake a vehicle, and so forth before the vehicle enters an intersection with a traffic light in the case where the red traffic light (or yellow traffic light) is predicted to be on at the time when the vehicle enters the intersection. It is important for such a driving assisting apparatus to predict the state of the traffic light at the time when the vehicle enters the intersection. Patent Literature 1 discloses that the state of the traffic light at the time when the vehicle enters the intersection is predicted according to the cycle information of the traffic light, the remaining distance from the vehicle to the intersection, and the current vehicle speed. Patent Literature 2 discloses that the time required for passing the intersection is predicted also in view of surrounding circumstances of the own vehicle (states of other vehicles, pedestrian information, etc.), so as to determine whether or not the intersection is passable.

Patent Literature 1: Japanese Patent Application Laid-Open No. 2006-72936
Patent Literature 2: Japanese Patent Application Laid-Open No. 2006-58100

DISCLOSURE OF INVENTION

Technical Problem

There are cases where the vehicle accelerates or decelerates in response to various road states, other vehicles' states, and the like, so that the vehicle speed changes even in front of the intersection. Therefore, there is a case where a warning is issued and so forth even when the own vehicle is accelerated so as to be able to pass the intersection with the green traffic light after it was predicted according to the current vehicle speed that the red traffic light would prohibit the vehicle from passing the intersection at the time of entrance. On the other hand, there is a case where no warning is issued and so forth when the own vehicle is decelerated so as to be unable to pass the intersection with the red traffic light after it was predicted according to the current vehicle speed that the green light would allow the vehicle to pass the intersection. Thus, there are cases where the state of the traffic light at the time of entering the intersection cannot accurately be predicted according to the current vehicle speed.

It is therefore an object of the present invention to provide a driving assisting apparatus and driving assisting method which can predict with a high accuracy the state of the traffic light at the time when the vehicle enters the intersection.

Solution to Problem

The driving assisting apparatus in accordance with the present invention is a driving assisting apparatus for predicting a state of a traffic light when a vehicle enters an intersection, the apparatus comprising vehicle speed change predicting means for predicting a vehicle speed change of the vehicle in front of the intersection, and traffic light state predicting means for predicting the state of the traffic light when the vehicle enters the intersection according to the vehicle speed change predicted by the vehicle speed change predicting means. The driving assisting method in accordance with the present invention is a driving assisting method for predicting a state of a traffic light when a vehicle enters an intersection, the method comprising a vehicle speed change predicting step of predicting a vehicle speed change of the vehicle in front of the intersection, and a traffic light state predicting step of predicting the state of the traffic light when the vehicle enters the intersection according to the vehicle speed change predicted by the vehicle speed change predicting step.

In this driving assisting apparatus, the vehicle speed predicting means predicts a vehicle speed change in front of the intersection. Then, in the driving assisting apparatus, the traffic light state predicting means predicts the state of the traffic light (green, yellow, or red light) at the time when the vehicle enters the intersection according to the predicted vehicle speed change in addition to conventionally used information such as the traffic light information, current vehicle speed, and remaining distance to the intersection. Thus, the driving assisting apparatus can predict with a high accuracy the state of the traffic light at the time when the vehicle enters the intersection by taking account of a future vehicle speed change in front of the intersection as well. When carried out with such a highly accurate traffic light state at the time of entering the intersection, driving assistance (warning output or vehicle control) can be done more appropriately. The driving assisting method can also yield advantageous effects similar to those of the driving assisting apparatus mentioned above.

The driving assisting apparatus in accordance with the present invention may further comprise storage means for storing a characteristic concerning a past vehicle speed change of a driver of the vehicle in front of the intersection in association with a running environment, while the vehicle speed change predicting means may predict the vehicle speed change of the vehicle according to information stored in the storage means. The driving assisting method in accordance with the present invention may further comprise a storing step of storing a characteristic concerning a past vehicle speed change of a driver of the vehicle in front of the intersection in association with a running environment, while the vehicle speed change predicting step may predict the vehicle speed change of the vehicle according to information stored in the storing step.

In this driving assisting apparatus, a characteristic concerning a past vehicle speed change of the driver in front of the intersection is stored in the storage means in association with the running environment. Examples of the characteristic concerning the vehicle speed change include vehicle speed time-series information and degrees of acceleration and deceleration. Examples of the running environment include road information (road form information, slope information, the number of lanes, vehicle width, etc.), other vehicle information (vehicle speed, position, etc.), system actuation information (ON/OFF of constant vehicle speed control, etc.), and traffic light information. In the driving assisting apparatus, the vehicle speed change predicting means compares the actual running environment during running with the running environment stored in the storage means, so as to predict the vehicle speed change in front of the intersection corresponding to the actual running environment. Thus, by predicting the vehicle speed change in front of the intersection while also taking account of a driving behavior characteristic intrinsic to the driver, the driving assisting apparatus can predict with a higher accuracy the state of the traffic light at the time of entering the intersection. The driving assisting method can also yield advantageous effects similar to those of the driving assisting apparatus mentioned above.

In the driving assisting apparatus in accordance with the present invention, the vehicle speed change predicting means may change a method of predicting the vehicle speed change depending on whether or not the vehicle is positioned in front of a predetermined area set in front of the intersection. In the driving assisting method in accordance with the present invention, the vehicle speed change predicting step may change a method of predicting the vehicle speed change depending on whether or not the vehicle is positioned in front of a predetermined area set in front of the intersection.

In the driving assisting apparatus, the vehicle speed change predicting means determines whether or not the vehicle is positioned in front of a predetermined area in front of the intersection, and changes a method of predicting the vehicle speed change depending on whether or not the vehicle is located in front of this area. The predetermined area is an area where there is a temporary vehicle speed change (such as acceleration) in front of the intersection. When the traffic light is green at the intersection, for example, the driver psychologically prefers to pass there with the green light and thus tends to accelerate temporarily in the predetermined area in front of the intersection. Therefore, the vehicle speed change is predicted according to the temporary acceleration in the predetermined area before passing the predetermined area, but by another method after passing the predetermined area. Thus, by predicting the vehicle speed change in front of the intersection while taking account of the predetermined area in front of the intersection, the driving assisting apparatus can predict with a higher accuracy the state of the traffic light at the time of entering the intersection. The driving assisting method can also yield advantageous effects similar to those of the driving assisting apparatus mentioned above.

The driving assisting apparatus in accordance with the present invention may further comprise vehicle speed detecting means for detecting a vehicle speed, second traffic light state predicting means for predicting a state of the traffic light when the vehicle enters the intersection according to the vehicle speed detected by the vehicle speed detecting means, and driving assisting means for assisting driving according to the state of the traffic light predicted by the traffic light state predicting means and the state of the traffic light predicted by the second traffic light state predicting means. The driving assisting method in accordance with the present invention may further comprise a vehicle speed detecting step of detecting a vehicle speed, a second traffic light state predicting step of predicting a state of the traffic light when the vehicle enters the intersection according to the vehicle speed detected in the vehicle speed detecting step, and a driving assisting step of assisting driving according to the state of the traffic light predicted in the traffic light state predicting step and the state of the traffic light predicted in the second traffic light state predicting step.

In this driving assisting apparatus, the traffic light state predicting means predicts the state of the traffic light at the time of entering the intersection while taking account of the future vehicle speed change as mentioned above. Also, in the driving assisting apparatus, the vehicle speed detecting means detects the vehicle speed, and the second traffic light state predicting means predicts the state of the traffic light at the time of entering the intersection according to the current vehicle speed detected by the second traffic light state predicting means. Then, the driving assisting means assists driving according to the state of the traffic light predicted by the traffic light state predicting means and the state of the traffic light predicted by the second traffic light state predicting means. Thus, by assisting driving according to the results of predictions based on two predicting means, the driving assisting apparatus can perform more appropriate driving assistance. The driving assisting method can also yield advantageous effects similar to those of the driving assisting apparatus mentioned above.

Preferably, in the driving assisting apparatus in accordance with the present invention, the driving assisting means assists stopping when at least one of the state of the traffic light predicted by the traffic light state predicting means and the state of the traffic light predicted by the second traffic light state predicting means is a stop signal lit state, and a content of the stopping assistance is changed depending on whether or not both of the state of the traffic light predicted by the traffic light state predicting means and the state of the traffic light predicted by the second traffic light state predicting means are the stop signal lit state. Preferably, in the driving assisting method in accordance with the present invention, the driving assisting step assists stopping when at least one of the state of the traffic light predicted in the traffic light state predicting step and the state of the traffic light predicted in the second traffic light state predicting step is a stop signal lit state, and a content of the stopping assistance is changed depending on whether or not both of the state of the traffic light predicted in the traffic light state predicting step and the state of the traffic light predicted in the second traffic light state predicting step are the stop signal lit state.

In this driving assisting apparatus, the driving assisting means assists stopping in the case where at least one of the traffic light state predicting means and the second traffic light state predicting means predicts the stop signal lit state as the state of the traffic light at the time when the vehicle enters the intersection. Examples of the stopping assistance include provision of information such as traffic light states, calls for attention and warning outputs for promoting a stop, and vehicle control such as automatic braking for a stop. In particular, the driving assisting means changes the content of stopping assistance depending on whether only one or both of the traffic light state predicting means and the second traffic light state predicting means predict the stop signal lit state. That is, since the accuracy of prediction varies depending on whether only one or both of them predict the above-mentioned state, the stopping assistance level is changed according to the accuracy of prediction. As an example of changing the content of the stopping assistance, the stopping assistance level is made lower when only one predicts the stop signal lit state than when both predict the stop signal lit state. Examples of lowering the assistance level include changing from a warning output for promoting a stop to a call for attention, provision of information, or the like (changing from a strong content to a weak content in the warning output per se), changing from vehicle control to a warning output or the like, and changing the degree of vehicle control from automatic stopping to assisted braking or the like. This can prevent the driving assisting apparatus from missing the stopping assistance, while evading vexation of erroneous stopping assistance, whereby more appropriate stopping assistance can be carried out. The driving assisting method can also yield advantageous effects similar to those of the driving assisting apparatus mentioned above.

Preferably, the driving assisting apparatus further comprises driving assisting means for assisting stopping when the state of the traffic light predicted by the traffic light state predicting means is the stop signal lit state, and running state estimating means for estimating a running state of the vehicle at a point of time when the traffic light state predicting means predicts the stop signal lit state according to the vehicle speed change predicted by the vehicle speed change predicting means, and the driving assisting means changes the content of the stopping assistance according to the running state estimated by the running state estimating means. Preferably, the driving assisting method further comprises a driving assisting step of assisting stopping when the state of the traffic light predicted in the traffic light state predicting step is the stop signal lit state, and a running state estimating step of estimating a running state of the vehicle at a point of time when the traffic light state predicting step predicts the stop signal lit state according to the vehicle speed change predicted in the vehicle speed change predicting step, and the driving assisting step changes the content of the stopping assistance according to the running state estimated in the running state estimating step.

In this driving assisting apparatus, in the case where the traffic light state predicting means predicts the stop signal lit state as the state of the traffic light at the time when the vehicle enters the intersection, the running state estimating means estimates the running state of the vehicle (vehicle speed, vehicle position (remaining distance to the intersection), or the like) at a point of time predicted to attain the stop signal lit state according to the future vehicle speed change in front of the intersection. Further, in the case where the traffic light state predicting means predicts the stop signal lit state as the state of the traffic light at the time when the vehicle enters the intersection, the driving assisting means in the driving assisting apparatus assists stopping according to the content of the stopping assistance changed depending on the estimated running state. For changing the content of the stopping assistance, the control level of vehicle control (braking control) per se or the content of the warning output, call for attention, or the like per se may be altered, various kinds of stopping assistance such as vehicle control, warning output, call for attention, and provision of information may be varied stepwise, or the timing for assistance may be changed. Thus, by changing the content of the stopping assistance according to the estimated running state of the vehicle at the time achieving the stop signal lit state while taking account of the future vehicle speed change, this driving assisting apparatus can carry out more appropriate stopping assistance. The driving assisting method can also yield advantageous effects similar to those of the driving assisting apparatus mentioned above.

ADVANTAGEOUS EFFECTS OF INVENTION

The present invention can predict with a high accuracy the state of a traffic light at the time of entering an intersection by also taking account of a future vehicle speed change in front of the intersection.

BRIEF DESCRIPTION OF DRAWINGS

[FIG. 16] is a table listing contents (HMI) and timings of calls for attention corresponding to predicted vehicle speeds and remaining distances at the time when the red traffic light begins to turn on in accordance with the third embodiment; and

[FIG. 17] is a flowchart illustrating a process flow in an ECU of FIG. 11.

REFERENCE SIGNS LIST 1, 2, 3 . . . signal misrecognition preventing apparatus; 10 . . . optical beacon receiver; 11 . . . GPS receiver; 12 . . . vehicle speed sensor; 20 . . . alarm; 23 . . . attention calling device; 31, 32, 33 . . . ECU; 32a, 33a . . . database Description Of Embodiments In the following, embodiments of the driving assisting apparatus and driving assisting method in accordance with the present invention will be explained with reference to the drawings.

The embodiments apply the driving assisting apparatus and driving assisting method in accordance with the present invention to signal misrecognition preventing apparatus mounted in a vehicle. In order to prevent the vehicle from passing an intersection with a red traffic light, the signal misrecognition preventing apparatus in accordance with the embodiments issue a warning in the case where the red traffic light is predicted at the time of entering the intersection. The embodiments encompass two modes which differ from each other in terms of methods of predicting a future vehicle speed change. The first embodiment is in a mode of prediction taking account of a temporary acceleration zone (corresponding to a predetermined area) in front of the intersection, while the second embodiment is in a mode of prediction taking account of a driving behavior characteristic intrinsic to a driver. In order to prevent the vehicle from passing an intersection with a red traffic light, the signal misrecognition preventing apparatus in accordance with an embodiment (third embodiment) calls for attention in the case where the red traffic light is predicted at the time of entering the intersection. The signal misrecognition preventing apparatus in accordance with the third embodiment employs the predicting method in accordance with the second embodiment.

Figure 1:
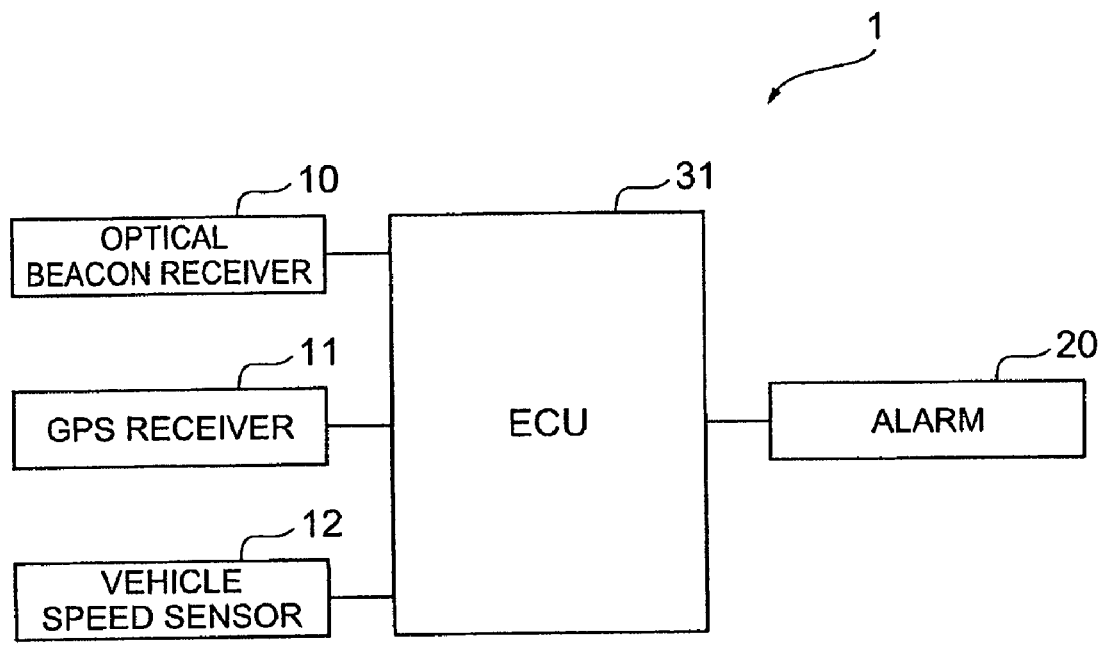
[FIG. 1] is a structural diagram of a signal misrecognition preventing apparatus in accordance with a first embodiment.
Figure 2:
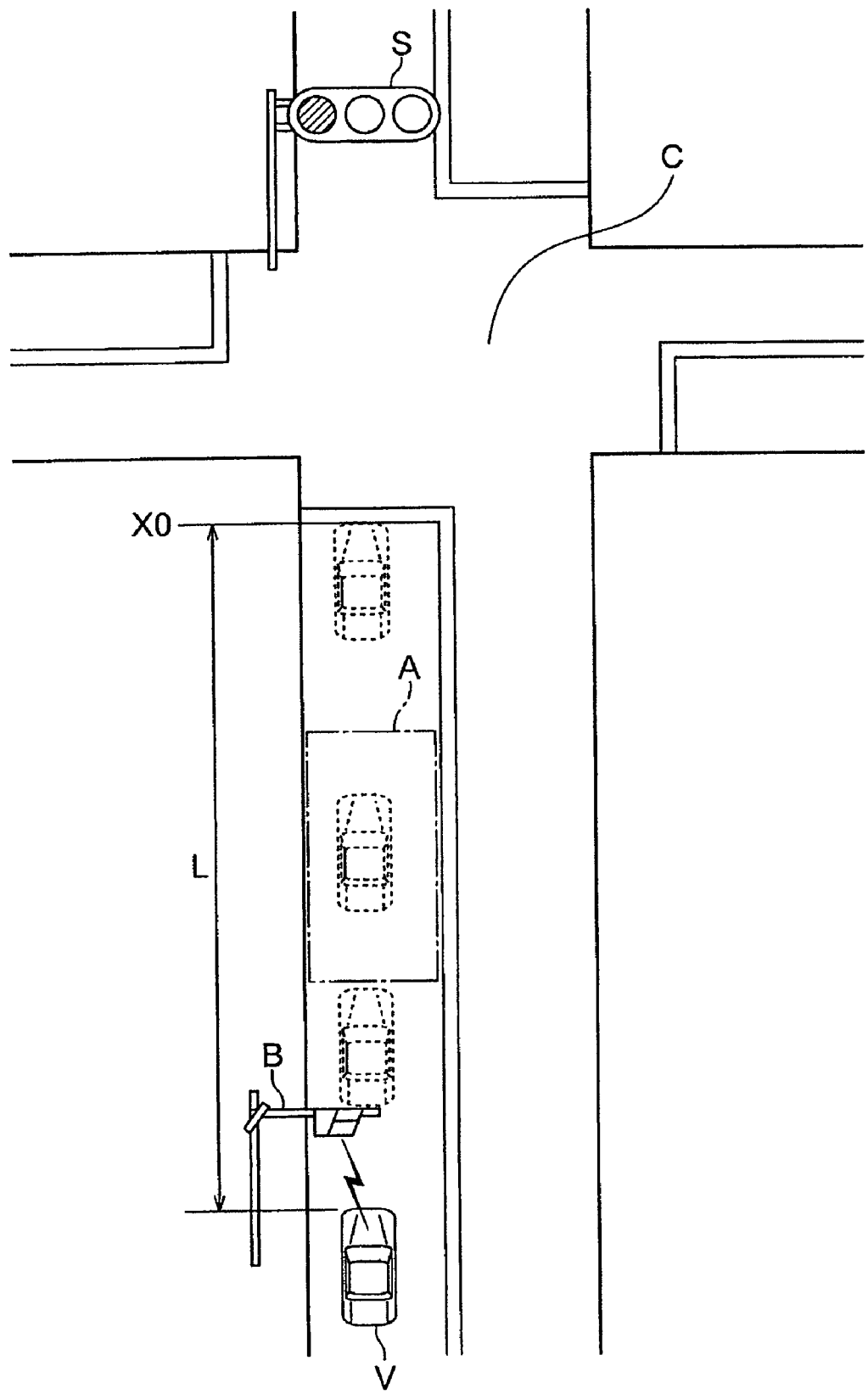
[FIG. 2] is an explanatory view of a prediction taking account of a temporary acceleration in front of an intersection in accordance with the first embodiment.
Figure 3:
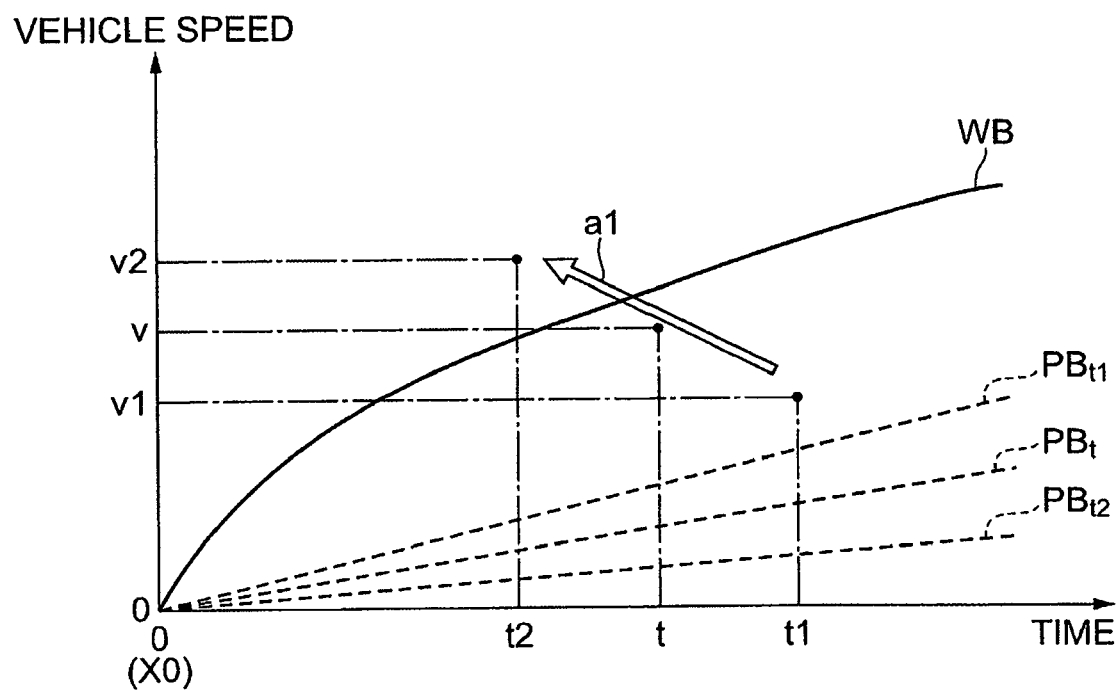
[FIG. 3] is a chart illustrating an example of passable boundaries and warning condition boundaries when taking account of a continuous acceleration in accordance with the first embodiment.
Figure 4:
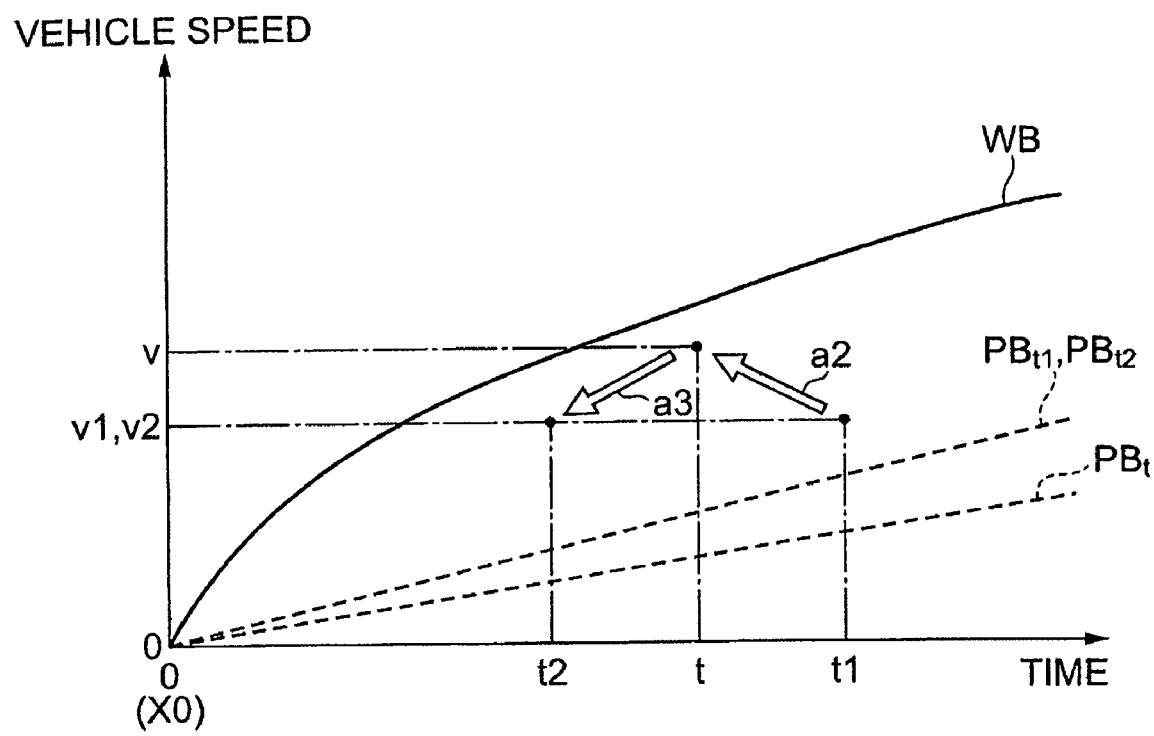
[FIG. 4] is a chart illustrating an example of passable boundaries and warning condition boundaries when taking account of the temporary acceleration in accordance with the first embodiment.

With reference to FIGS. 1 to 4, the signal misrecognition preventing apparatus 1 in accordance with the first embodiment will be explained. FIG. 1 is a structural diagram of the signal misrecognition preventing apparatus in accordance with the first embodiment. FIG. 2 is an explanatory view of a prediction taking account of a temporary acceleration in front of an intersection in accordance with the first embodiment. FIG. 3 is a chart illustrating an example of passable boundaries and warning condition boundaries when taking account of a continuous acceleration in accordance with the first embodiment. FIG. 4 is a chart illustrating an example of passable boundaries and warning condition boundaries when taking account of the temporary acceleration in accordance with the first embodiment.

The signal misrecognition preventing apparatus 1 predicts the state of a traffic light at the time when the own vehicle passes an intersection, and determines a warning according to the result of prediction. In particular, for increasing the accuracy in predicting the time elapsed until the own vehicle reaches the intersection, the signal misrecognition preventing apparatus 1 predicts a temporary acceleration in front of the intersection and takes accounts of this temporary acceleration. For this purpose, the signal misrecognition preventing apparatus 1 comprises an optical beacon receiver 10, a GPS (Global Positioning System) receiver 11, a vehicle speed sensor 12, an alarm 20, and an ECU (Electronic Control Unit) 31.

In the first embodiment, processes in the ECU 31 correspond to the vehicle speed change predicting means and traffic light state predicting means recited in the claims.

An example of temporary accelerations in front of an intersection will be explained with reference to FIG. 2. When seeing the green light of a traffic light S in front of an intersection C during approaching there, the driver psychologically prefers to pass there with the green light. At this time, the driver tends to accelerate temporarily in order to pass there with the green traffic light. Since this temporary accelerating behavior turns off the accelerator (without actuating the brake) after turning it on, a deceleration due to engine braking occurs after the acceleration. Therefore, the vehicle speed is temporarily accelerated immediately in front of the intersection and then is decelerated.

The area where the temporary acceleration is carried out in front of the intersection is set as a temporary acceleration zone A. The temporary acceleration zone A is set by an actual running test or the like. The temporary acceleration zone A may have a fixed value; a value depending on the road form (straight road, curved road, uphill, downhill, etc.), road width, number of lanes, and the like in front of the intersection; or a value for each intersection corresponding to a driving behavior intrinsic to the driver. Information of the temporary acceleration zone A includes at least the length of the zone from its front end to rear end and the distance from the front end to the intersection (stop line). The fixed value may be held beforehand by the ECU 31. The value corresponding to each intersection may be received as an item of infrastructure information from an optical beacon B. The value intrinsic to the driver must be learned by the ECU 31, and a value obtained by the learning may be used.

The degree of acceleration in the temporary acceleration zone A and the degree of deceleration thereafter are set by an actual running test or the like. These degrees of acceleration and deceleration may be fixed values, values corresponding to the current vehicle speed and the like, or values corresponding to a driving behavior intrinsic to the driver. The fixed values may be held beforehand by the ECU 31. The values corresponding to the vehicle speed and the like may be calculated each time by the ECU 31. The values intrinsic to the driver must be learned by the ECU 31, and values obtained by the learning may be used.

The optical beacon receiver 10, which comprises an optical beacon antenna, a processor, and the like, receives information through infrared rays from the optical beacon B placed at a predetermined position in front of the intersection C. By using the optical beacon antenna within a downlink area, the optical beacon receiver 10 receives a signal from the optical beacon B. The optical beacon receiver 10 demodulates the received signal with the processor, so as to take out the downlink information, and transmits the downlink information to the ECU 31. An optical beacon transceiver capable of transmitting/receiving information to/from the optical beacon may also be used.

Examples of the downlink information include VICS (Vehicle Information Communication System) information and infrastructure information. The VICS information is road traffic information common to all the lanes. Examples of the road traffic information include traffic jam information, traffic regulation information, and parking information. Examples of the infrastructure information, which is lane information constructed for each lane, include signal cycle information, road form information, stop line information, and lane identification information for each lane. Examples of the signal cycle information include respective lighting times of green, yellow, and red traffic lights, the lighting time of the right turn signal, and the currently lit signal and the time elapsed after it turned on. For example, it is seen from the signal cycle information how many seconds it takes for the red traffic light to turn on from now and how many seconds it takes for the right tam light to turn on and off from now. The road form information, which is information indicative of surrounding road forms, includes slope information (uphill/downhill and slope angle) as well. An example of the stop line information is positional information of a stop line at the intersection. When the optical beacon B can acquire information of other vehicles (position, vehicle speed, etc.), the other vehicle information is also included in the infrastructure information.

The GPS receiver 11, which comprises a GPS antenna, a processor, and the like, estimates the current position of the own vehicle and the like. By using the GPS antenna, the GPS receiver 11 receives GPS signals from GPS satellites. The GPS receiver 11 demodulates the GPS signals with the processor and calculates the current position (longitude and latitude) of the own vehicle and the like according to thus demodulated positional data of the GPS satellites. Then, the GPS receiver 11 transmits the current positional information of the own vehicle and the like to the ECU 31. Here, the GPS receiver 11 receives respective GPS signals from three or more different GPS satellites, since positional data of at least three GPS satellites are necessary for calculating the current position. When the vehicle is mounted with a navigation system, the GPS receiver of the navigation system may be used in common, or the current position may be acquired from the navigation system.

The vehicle speed sensor 12 is a sensor for detecting the vehicle speed. The vehicle speed sensor 12 detects the vehicle speed and transmits the detected vehicle speed information to the ECU 31.

The alarm 20, which is a device for outputting a warning informing that the red traffic light is predicted when the own vehicle enters the intersection, outputs a sound, displays an image, and so forth as a warning output. Upon receiving a warning signal from the ECU 31, the alarm 20 outputs a sound or displays an image in response to the warning signal.

The ECU 31, which is an electronic control unit comprising a CPU (Central Processing Unit), a ROM (Read Only Memory), a RAM (Random Access Memory), and the like, controls the signal misrecognition preventing apparatus 1 as a whole. The ECU 31 receives respective information items from the optical beacon receiver 10, GPS receiver 11, and vehicle speed sensor 12 at fixed intervals, executes processes according to these information items, and transmits a warning signal to the alarm 20 when it is determined that the warning is necessary.

Before specifically explaining the individual processes of the ECU 31, a warning condition boundary WB and a passable boundary line PB which are used in the ECU 31 will be explained with reference to FIGS. 3 and 4. In each of FIGS. 3 and 4, the abscissa is the time (remaining time) required for reaching the intersection C (stop line) from the present, while the ordinate is the vehicle speed of the own vehicle V. The abscissa may be the distance (remaining distance L) from the current position to the intersection C (stop line) instead of the remaining time.

The passable boundary PB is a boundary of whether or not the own vehicle V can pass the intersection C (whether the traffic light is green, yellow, or red at the time of entering the intersection). The area on the upper side of the passable boundary PB is an area where the own vehicle V can pass the intersection C (where the traffic light is green or yellow at the time of entering the intersection). The area on the lower side of the passable boundary PB is an area where the own vehicle V cannot pass the intersection C (where the traffic light is red at the time of entering the intersection). The passable boundary PB, which is a line variable depending on the remaining time and the vehicle speed, decreases its gradient as the vehicle speed is higher. In the example of FIG. 3, the intersection C is passable in the case of the remaining time t and vehicle speed V at present that is above a passable boundary $PB_t$, in the case of the remaining time t1 and vehicle speed v1 in the past that is above a passable boundary $PB_{t1}$, and in the case of the remaining time t2 and vehicle speed v2 in future that is above a passable boundary $PB_{t2}$.

The warning condition boundary WB, which is a curve indicating the degree of deceleration of the own vehicle V in the case where the driver carries out a braking operation, is a boundary of whether or not the warning output is necessary. The area on the lower side of the warning condition boundary WB is an area where the own vehicle V can safely stop at the stop line of the intersection C, so that no warning output is necessary. The area on the upper side of the warning condition boundary WB is an area where the own vehicle V cannot safely stop at the stop line of the intersection C, so that the warning output is necessary. The warning condition boundary WB is a fixed curve corresponding to the braking performance of the vehicle or the like and is set beforehand by an actual running experiment or the like. In the example of FIG. 3, the vehicle V can safely stop at the stop line of the intersection C in the case of the remaining time t and vehicle speed v at present that is below the warning condition boundary WB and in the case of the remaining time t1 and vehicle speed v1 in the past that is below the warning condition boundary WB, but cannot safely stop at the stop line of the intersection C in the case of the remaining time t2 and vehicle speed v2 in future that is above the warning condition boundary WB.

Therefore, the relationship between the remaining time and vehicle speed at each point of time is determined with reference to the passable boundary PB and warning condition boundary WB, and the warning is issued when the relationship between the remaining time and vehicle speed falls within an area on the lower side of the passable boundary PB and on the upper side of the warning condition boundary WB.

According to the positional information of the stop line at the intersection C from the optical beacon receiver 10 and the current position from the GPS receiver 11, the ECU 31 calculates the remaining distance L to the intersection C (stop line). Then, according to information of the remaining distance L and temporary acceleration zone A, the ECU 31 determines whether or not the own vehicle V is in front of the temporary acceleration zone A (has not passed the temporary acceleration zone A yet). Further, when it is determined that the own vehicle V is in front of the temporary acceleration zone A, the ECU 31 determines whether or not the traffic light S is green at the time of entering the temporary acceleration zone A according to the signal cycle information from the optical beacon receiver 10, the current vehicle speed from the vehicle speed sensor 12, and the calculated remaining distance L.

When it is determined that the temporary acceleration zone A has already been passed or when it is determined that the temporary acceleration zone A has not been passed yet and that the traffic light is not green at the time of entering the temporary acceleration zone A, the ECU 31 carries out a normal warning determination without considering the temporary acceleration in the temporary acceleration zone A. When it is determined that the temporary acceleration zone A has not been passed yet and that the traffic light is green at the time of entering the temporary acceleration zone A, on the other hand, a warning determination is carried out while taking account of the temporary acceleration in the temporary acceleration zone A. Each warning determination uses the passable boundary PB and warning condition boundary WB.

In the case of the normal warning determination, the ECU 31 calculates the degree of acceleration/deceleration according to the previous (past) vehicle speed and the current vehicle speed at this time (at present). Not only the previous vehicle speed but a plurality of past vehicle speeds may also be used for calculating the degree of acceleration/deceleration. Assuming that thus calculated degree of acceleration/deceleration will continue in future, the ECU 31 predicts a future vehicle speed change and predictably estimates a future vehicle speed by adding the vehicle speed change to the current vehicle speed. Further, the ECU 31 sets the passable boundary PB in response to the future vehicle speed. In the example of FIG. 3, for instance, a degree of acceleration a1 is determined from the vehicle speed v at the remaining time t at present and the vehicle speed v1 at the remaining time t1 in the past, whereby the vehicle speed v2 at the remaining time t2 in future can be predicted according to the degree of acceleration a1 and the vehicle speed v at present if the degree of acceleration at is assumed to continue in future. When the passable boundary $PB_{t1}$ corresponding to the vehicle speed v1 in the past, the passable boundary $PB_t$ corresponding to the vehicle speed v at present, and the passable boundary $PB_{t2}$ corresponding to the vehicle speed v2 in future are compared with each other, the gradient of the passable boundary PB gradually decreases with time, thereby increasing the area where the intersection C is passable. The degree of acceleration/deceleration may be acquired by an acceleration sensor or the like as well.

Taking account of the predictably calculated future vehicle speed, the ECU 31 calculates the remaining time required for reaching the intersection C (stop line). Then, with reference to the set passable boundary PB, the ECU 31 determines whether or not the intersection is passable according to the relationship between the predicted remaining time and future vehicle speed. When it is determined that the intersection is passable, the ECU 31 terminates the processing concerning this intersection C. When it is determined that the intersection is not passable (the red traffic light is predicted at the time of entering the intersection), on the other hand, the ECU 31 takes it as a warning wait state and determines according to the relationship between the predicted remaining time and future vehicle speed with reference to the warning condition boundary WB whether or not a warning output is necessary. When it is determined that no warning output is necessary, the ECU 31 repeats the above-mentioned processes after the lapse of a fixed time. When it is determined that the warning output is necessary, the ECU 31 generates a warning sound or warning image with respect to the red traffic light at the time of entering the intersection and transmits it as a warning signal to the alarm 20.

In the case of the alarm determination taking account of the temporary acceleration, the ECU 31 predicts a future vehicle speed change according to the degree of acceleration in the temporary acceleration zone A and the degree of deceleration thereafter, and predictably calculates a future vehicle speed by adding the vehicle speed change to the current vehicle speed. Then, the ECU 31 sets a passable boundary PB corresponding to the future vehicle speed. In the example of FIG. 4, for instance, the vehicle is temporarily accelerated at a degree of acceleration a2 during a period from the remaining time t1 in the past to the remaining time t at present and decelerated at a degree of deceleration a3 (negative degree of acceleration) by engine braking during a period from the remaining time t at present to the remaining time t2 in future. The vehicle speed v2 at the remaining time t2 in future can be predicted according to the degree of deceleration a3 and the vehicle speed v at present. In this example, the predicted vehicle speed v2 equals the vehicle speed v1 in the past. When the passable boundary $PB_{t1}$ corresponding to the vehicle speed v1 in the past and the passable boundary $PB_{t2}$ corresponding to the predicted vehicle speed v2 in future are compared with each other, the predicted vehicle speed v2 and the vehicle speed v1 in the past equal each other, so that the passable boundaries $PB_{t1}$ and $PB_{t2}$ have the same gradient, thereby yielding the same area where the intersection C is passable. When the passable boundary $PB_t$ corresponding to the vehicle speed v at present and the passable boundary $PB_{t2}$ are compared with each other, the gradient of the passable boundary $PB_{t2}$ is greater than that of the passable boundary $PB_t$, thereby decreasing the area where the intersection C is passable.

Taking account of the predictably calculated future vehicle speed, the ECU 31 calculates the remaining time required for reaching the intersection C (stop line). Then, with reference to the set passable boundary PB, the ECU 31 determines according to the relationship between the predicted remaining time and future vehicle speed whether or not the intersection is passable. When it is determined that the intersection is passable, the ECU 31 terminates the processing concerning this intersection C. When it is determined that the intersection is not passable, on the other hand, the ECU 31 takes it as a warning wait state and determines according to the relationship between the predicted remaining time and future vehicle speed with reference to the warning condition boundary WB whether or not a warning output is necessary. When it is determined that no warning output is necessary, the ECU 31 repeats the above-mentioned processes after the lapse of a fixed time. When it is determined that the warning output is necessary, the ECU 31 transmits a warning signal to the alarm 20 as mentioned above.

The passable boundary PB and warning condition boundary WB may be determined according to the relationship between the remaining distance and vehicle speed instead of the relationship between the remaining time and vehicle speed.

Figure 5:
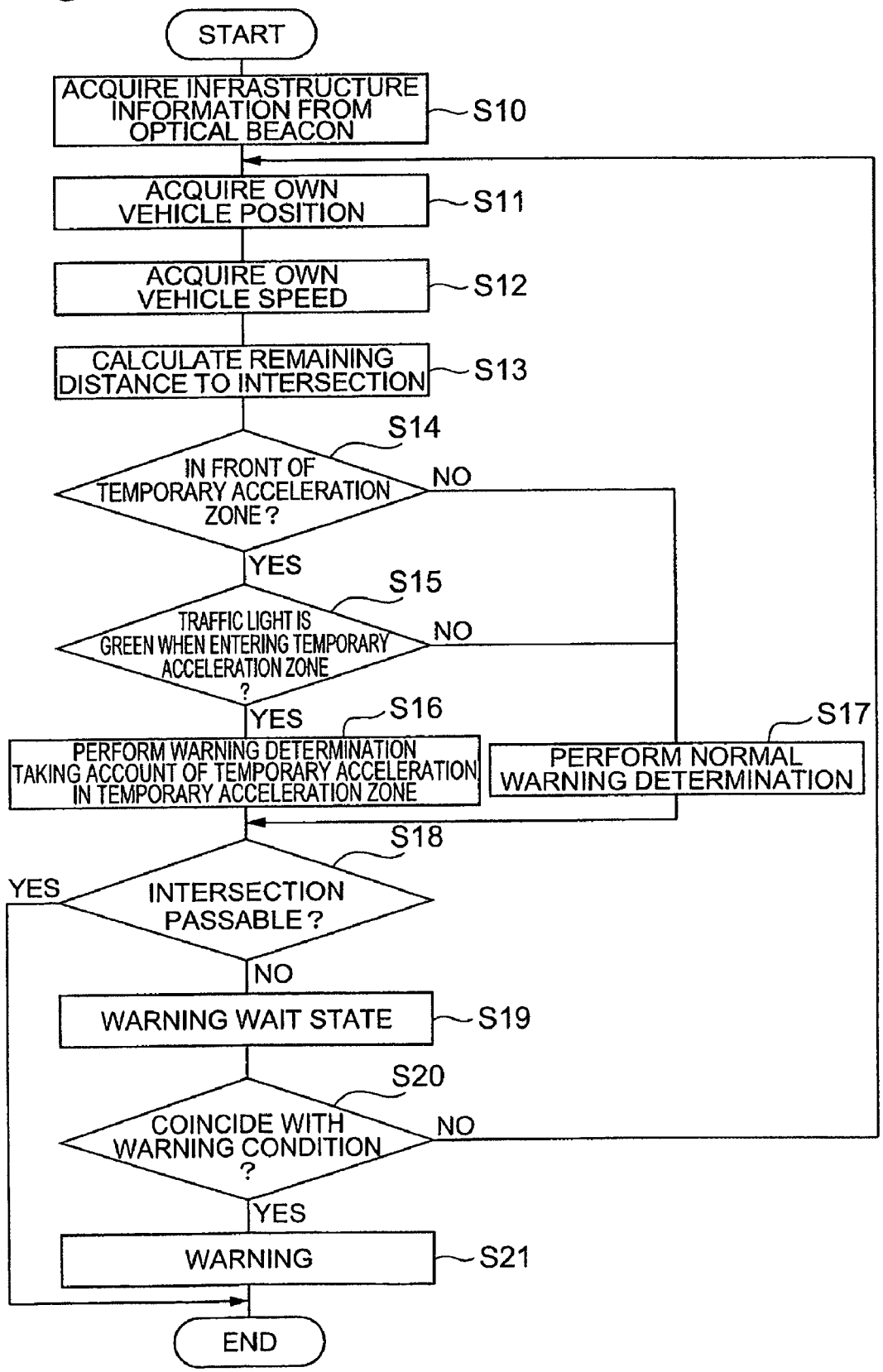
[FIG. 5] is a flowchart illustrating a process flow in an ECU of FIG. 1.

Operations of the signal misrecognition preventing apparatus 1 will now be explained with reference to FIGS. 1 to 4. In particular, the processing in the ECU 31 will be explained along the flowchart of FIG. 5. FIG. 5 is a flowchart illustrating the process flow in the ECU of FIG. 1.

When the own vehicle V enters a downlink area in front of the intersection, the optical beacon receiver 10 receives the infrastructure information and the like from the optical beacon B and transmits the infrastructure information to the ECU 31. At this time, the ECU 31 acquires the infrastructure information from the optical beacon receiver 10 (S10).

At fixed intervals, the GPS receiver 11 receives GPS information from GPS satellites, calculates the current position and the like from the GPS information, and transmits the current position to the ECU 31. The vehicle speed sensor 12 detects the vehicle speed of the own vehicle V and transmits the vehicle speed to the ECU 31. The ECU 31 acquires the current position from the GPS receiver 11 (S11) and obtains the vehicle speed from the vehicle speed sensor 12 (S12). Then, the ECU 31 calculates the remaining distance L to the intersection C from the current position and the positional information of the stop line of the intersection C in the infrastructure information (S13).

According to the remaining distance L and information about the temporary acceleration zone A, the ECU 31 determines whether or not the own vehicle A is in front of the temporary acceleration zone A (S14). When it is determined at S14 that the own vehicle V is in front of the temporary acceleration zone A, the ECU 31 determines whether or not the traffic light S at the intersection C is green or not at the time of entering the temporary acceleration zone A according to the signal information in the infrastructure information, the current vehicle speed, and the remaining distance L (S15).

When it is determined at S15 that the green traffic light is on at the time of entering the temporary acceleration zone A, the ECU 31 carries out a warning determination taking account of the temporary acceleration in the temporary acceleration zone A (S16). First, the ECU 31 predictably calculates a future vehicle speed taking account of the acceleration in the temporary acceleration zone A and the deceleration thereafter in addition to the current vehicle speed (S18). Then, the ECU 31 sets a passable boundary PB in response to the future vehicle speed (S18). Taking account of the future vehicle speed, the ECU 31 calculates the remaining time (S18). Using the values taking account of the temporary acceleration and deceleration, the ECU 31 determines from the relationship between the remaining time and future vehicle speed with reference to the passable boundary PB whether or not the intersection is passable (S18). When it is determined at S18 that the intersection is passable (the green or yellow traffic light is on at the time of entering the intersection), the ECU 31 terminates the processing concerning this intersection C.

When it is determined at S14 that the temporary acceleration zone A has already been passed or it is determined at S15 that the red or yellow traffic light is on at the time of entering the temporary acceleration zone A, the ECU 31 carries out a normal warning determination (S17). First, the ECU 31 calculates a degree of acceleration/deceleration according to the vehicle speed in the past and the current vehicle speed at present, and predictably calculates a future vehicle speed taking account of the degree of acceleration/deceleration in addition to the current vehicle speed (S18). In response to the future vehicle speed, the ECU 31 sets a passable boundary PB (S18). Taking account of the future vehicle speed, the ECU 31 also calculates the remaining time (S18). Using the values taking account of the degree of acceleration/deceleration, the ECU 31 determines according to the relationship between the remaining time and future vehicle speed with reference to the passable boundary PB whether or not the intersection is passable (S18). When it is determined at S18 that the intersection is passable, the ECU 31 terminates the processing concerning this intersection C.

When it is determined at S18 that the intersection is not passable (the red traffic signal is predicted at the time of entering the intersection), the ECU 31 attains a warning wait state (S19) and determines according to the relationship between the predicted remaining time and future vehicle speed with reference to the warning condition boundary WB whether or not a warning output is necessary (S20). When it is determined at S20 that no warning output is necessary, the ECU 31 returns to S11 after the lapse of a fixed time, so as to repeat the processes mentioned above. When it is determined at S20 that the warning output is necessary, on the other hand, the ECU 31 transmits to the alarm 20 a warning signal for carrying out a warning output with respect to the red traffic light at the time of entering the intersection, and terminates the processing concerning this intersection C (S21). Upon receiving the warning signal, the alarm 20 outputs a warning sound or displays a warning image. This warning makes the driver recognize that the intersection is not passable with the red traffic light and immediately perform a braking operation.

By taking account of a future vehicle speed change based on the temporary acceleration in the temporary acceleration zone A and the deceleration thereafter, the signal misrecognition preventing apparatus 1 can predict the remaining distance and remaining time to reach the intersection with a high accuracy, and can determine with a high precision whether or not the intersection is passable. Even when the temporary acceleration zone A has already been passed, by taking account of the future vehicle speed change based on the degree of acceleration/deceleration determined from the past vehicle speed change, the signal misrecognition preventing apparatus 1 can predict the remaining distance and remaining time to reach the intersection with a high accuracy, and can determine with a high precision whether or not the intersection is passable. As a result, warnings can be prevented from missing when necessary and erroneously issuing when unnecessary.

Figure 6:
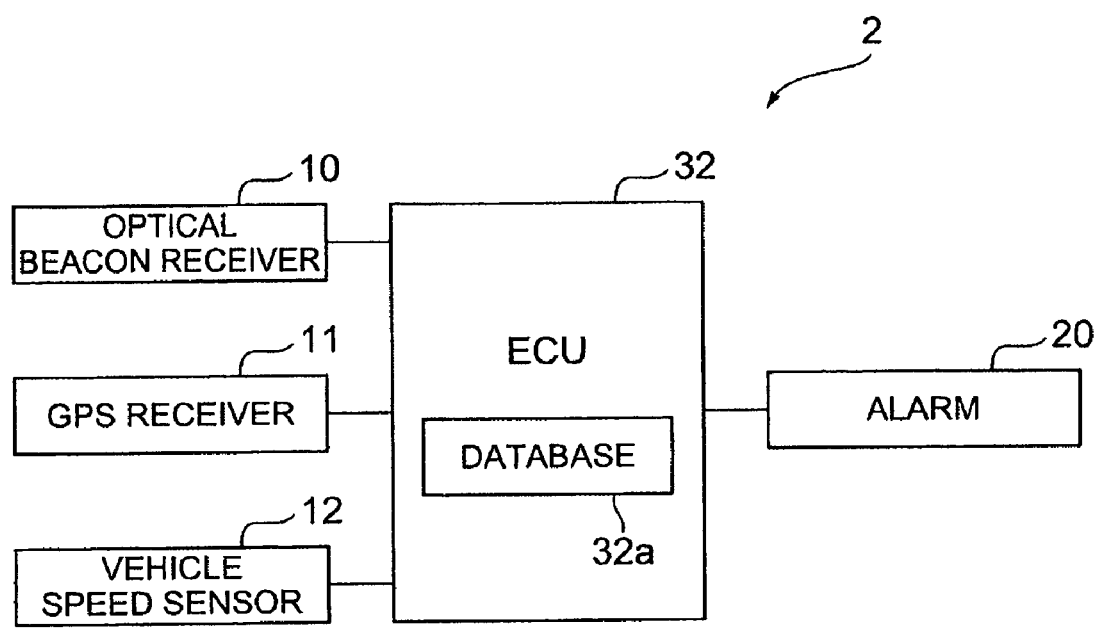
[FIG. 6] is a structural diagram of the signal misrecognition preventing apparatus in accordance with a second embodiment.
Figure 7:
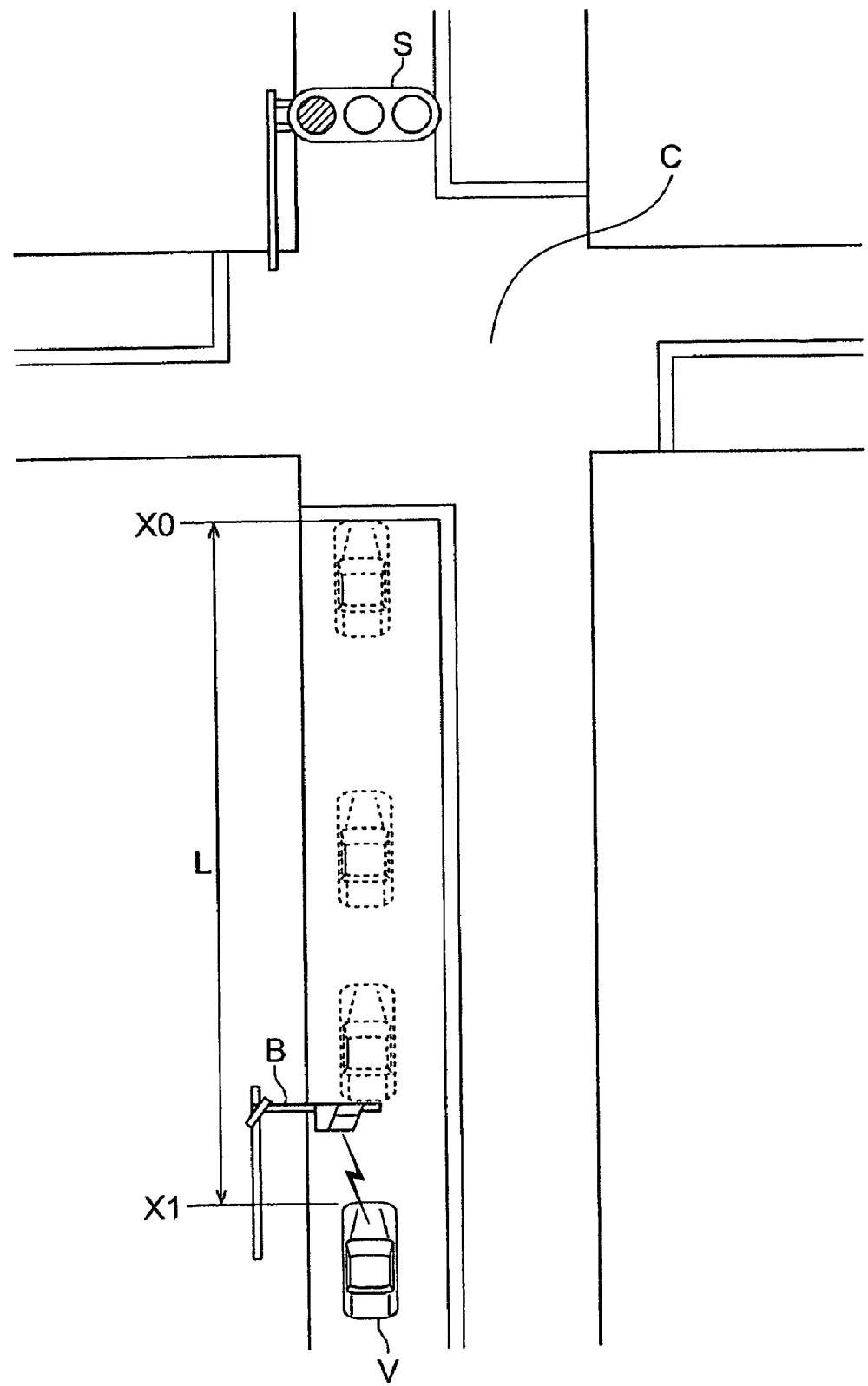
[FIG. 7] is an explanatory view of a prediction taking account of a vehicle speed change corresponding to a driving behavior intrinsic to a driver in front of the intersection in accordance with the second embodiment.
Figure 8:
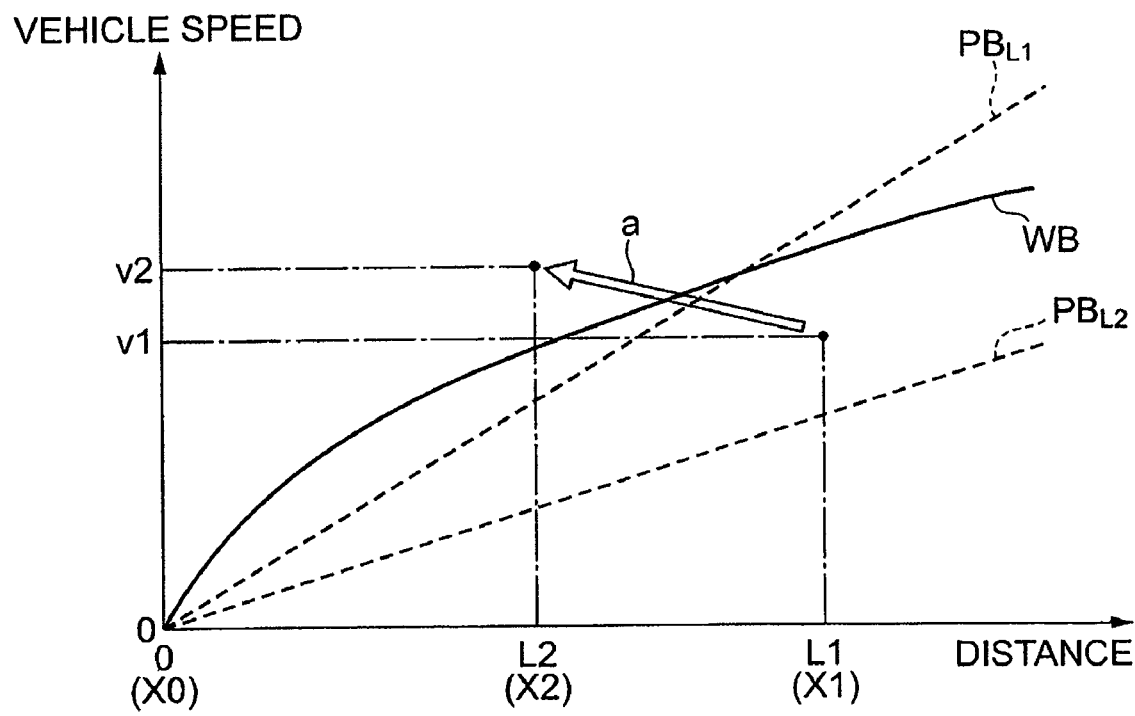
[FIG. 8] is a chart illustrating an example of passable boundaries and warning condition boundaries in accordance with the second embodiment.

With reference to FIGS. 6 to 8, the signal misrecognition preventing apparatus 2 in accordance with the second embodiment will be explained. FIG. 6 is a structural diagram of the signal misrecognition preventing apparatus in accordance with the second embodiment. FIG. 7 is an explanatory view of a prediction taking account of a vehicle speed change corresponding to a driving behavior intrinsic to a driver in front of the intersection in accordance with the second embodiment. FIG. 8 is a chart illustrating an example of passable boundaries and warning condition boundaries in accordance with the second embodiment. In the signal misrecognition preventing apparatus 2, structures similar to those of the signal misrecognition preventing apparatus 1 in accordance with the first embodiment will be referred to with the same signs while omitting their explanations.

The signal misrecognition preventing apparatus 2 predicts the state of a traffic light when the own vehicle passes an intersection, and carries out a warning determination according to the result of prediction. In particular, for enhancing the accuracy in predicting the time elapsed until the own vehicle reaches the intersection, the signal misrecognition preventing apparatus 2 predicts a vehicle speed change in response to surrounding circumstances of the own vehicle and a driving behavior intrinsic to the driver, and takes account of the vehicle speed change. For this purpose, the signal misrecognition preventing apparatus 2 comprises an optical beacon receiver 10, a GPS receiver 11, a vehicle speed sensor 12, an alarm 20, and an ECU 32, while a database 32a is constructed within the ECU 32.

In the second embodiment, processes in the ECU 32 correspond to the vehicle speed change predicting means and traffic light state predicting means recited in the claims, while the database 32a corresponds to the storage means recited in the claims.

With reference to FIG. 7, the vehicle speed change in front of the intersection will be explained. According to the state of the road, state of other vehicles, and the like in front of the intersection, the driver carries out an accelerating or decelerating operation. For example, while the vehicle usually accelerates on a downhill, some drivers carry out a decelerating operation in order to prevent the vehicle speed from increasing. When the traffic light S at the intersection C turns yellow, some drivers accelerate, while others decelerate. When a vehicle is seen in front, some drivers carry out an accelerating/decelerating operation so as to follow the front vehicle, while others perform a decelerating operation so as to increase the inter-vehicle gap. When there is a vehicle in an adjacent lane, some drivers carry out an accelerating/decelerating operation so as to follow this vehicle. Thus, a driver carries out various accelerating/decelerating operations in response to the surrounding circumstances. Therefore, when the past vehicle speed changes (corresponding to the driving behavior intrinsic to the driver) in front of the intersection and the surrounding circumstances are associated with each other and put into a database, the vehicle speed change can be predicted from the surrounding circumstances in front of the intersection.

There is also a case where the vehicle speed changes regardless of the driving behavior intrinsic to the driver. For example, the own vehicle V accelerates and decelerates on a downhill and an uphill in front of the intersection, respectively. When mounted with an ACC (Adaptive Cruise Control) apparatus which is in action, the own vehicle V accelerates/decelerates when a vehicle exists in front, but keeps a vehicle speed so as to attain a set vehicle speed when there is no vehicle in front. Therefore, the vehicle speed change can also be predicted from the surrounding circumstances, the operating state of the vehicle speed control apparatus, and the like.

When the optical beacon B can acquire information (position, vehicle speed, etc.) of a vehicle in front of the intersection, the infrastructure information downlinked from the optical beacon B includes vehicle information. Therefore, the own vehicle V can also acquire information of other vehicles in its surroundings.

The ECU 32, which is an electronic control unit constructed by a CPU, a ROM, a RAM, and the like, controls the signal misrecognition preventing apparatus 2 as a whole. The ECU 32 receives respective information items from the optical beacon receiver 10, GPS receiver 11, and vehicle speed sensor 12 at fixed intervals, executes processes according to these information items and the information stored in the database 32a, and transmits a warning signal to the alarm 20 when it is determined that the warning is necessary.

The ECU 32 also uses a warning condition boundary WB and a passable boundary PB, each plotting the distance and time on the abscissa and ordinate, respectively, as illustrated in FIG. 8. The ECU 32 also determines the relationship between the distance (remaining time) and vehicle speed at each position before the own vehicle V reaches the intersection C (stop line) according to the passable boundary PB and warning condition boundary WB, and outputs a warning in the case where the relationship falls within an area on the lower side of the passable boundary PB and upper side of the warning condition boundary WB.

The database 32a, which is constructed in a predetermined area of the RAM, stores information associating the surrounding circumstances in front of the intersection (after receiving the infrastructure information from the optical beacon B) with the driving behavior intrinsic to the driver. Examples of information stored in the database 32a for each intersection include road form information (uphill, downhill, slope angle, straight road, curved road, etc.), the number of lanes, lane width, information (position, vehicle speed, etc.) of other vehicles in the surroundings of the own vehicle V, the operating state of the vehicle speed control apparatus (e.g., the operating state of the ACC apparatus), and the signal cycle information at the intersection C with respect to the vehicle speed and remaining distance in time series for each intersection.

According to the positional information of the stop line at the intersection C from the optical beacon receiver 10 and the current position from the GPS receiver 11, the ECU 32 calculates the remaining distance L to the intersection C.

The ECU 32 determines whether or not there is the database 32a storing information about the past vehicle speed change indicative of the driving behavior intrinsic to the driver and the like (i.e., whether or not the vehicle speed change can be predicted by utilizing the database 32a). Here, it is determined not only whether or not the database 32a per se exists, but also whether or not data by which the vehicle speed change can be predicted is stored in the database 32a.

When there is the database 32a storing information about the past vehicle speed change and the like, the ECU 32 refers to information within the database 32a, and extracts information coinciding with or similar to the current running state from within the database 32a according to the road form information, signal cycle information, and other vehicle information from the optical beacon receiver 10, the operating state of other apparatus mounted in the own vehicle V for controlling the vehicle speed, and the like. From the vehicle speed information in the extracted information, the ECU 32 predicts a future vehicle speed. For example, when the traffic light turns yellow from green, the vehicle speed is predicted to increase in view of information about the past vehicle speed rise (the past accelerating behavior of the driver). When there is a vehicle in front or nearby, the vehicle speed is predicted to fluctuate in view of information about the past vehicle speed change following the vehicle speed of other vehicles (the past following behavior of the driver). How much the vehicle speed changes is determined by calculating from the past vehicle speed change extracted from the database 32a. The ECU 32 predictably calculates a fixture vehicle speed by adding thus predicted vehicle speed change to the current vehicle speed.

When there is no database 32a storing information about the past vehicle speed change and the like, the ECU 32 determines whether or not the vehicle speed change taking account of the surrounding circumstances and the like can be predicted. Here, it is determined whether or not the road form information and information about other vehicles in the surroundings can be acquired by the optical beacon receiver 10, or whether or not the operating state of the vehicle speed control apparatus mounted in the own vehicle V and the like can be acquired.

When the vehicle speed change taking account of the surrounding circumstances and the like can be predicted, the ECU 32 predicts a future vehicle speed change according to the road form information from the optical beacon receiver 10, the operating state of the vehicle speed control apparatus, and the like. For example, the vehicle speed is predicted to rise in the case of a downhill. When there is no vehicle in front while the ACC apparatus is in action, the vehicle speed is predicted to be unchanged. How much the vehicle speed changes on downhill, uphill, curved roads, and the like is determined beforehand by actual running experiments or the like. The ECU 32 predictably calculates a future vehicle speed by adding thus predicted vehicle speed change to the current vehicle speed.

When the vehicle speed change taking account of the surrounding circumstances and the like cannot be predicted, the ECU 32 predictably calculates a vehicle speed by subtracting a fixed vehicle speed from the current vehicle speed. The fixed vehicle speed is subtracted in order to determine whether or not the intersection is passable with a vehicle speed slightly lower than the current speed so as to make it possible to pass the intersection more safely. The fixed vehicle speed is set beforehand by an actual running experiment or the like.

The ECU 32 sets a passable boundary PB according to the future vehicle speed determined by the predictive calculation. In the example of FIG. 8, for instance, when an acceleration (a rise in the vehicle speed) is predicted from the past driving behavior of the driver, the vehicle is accelerated with a degree of acceleration a in a period from the current position X1 (remaining distance L1) immediately after downlinking from the optical beacon B to a future position X2 (remaining distance L2<L1), and a vehicle speed v2 at the future position X2 can be predicted from the degree of acceleration a and the vehicle speed v1 at the current position X1. When the passable boundary $PB_{L1}$ corresponding to the vehicle speed v1 at the current position X1 and the passable boundary $PB_{L2}$ corresponding to the predicted future vehicle speed v2 are compared with each other in this example, the gradient of the passable boundary $PB_{L2}$ is smaller than that of the passable boundary $PB_{L1}$, thereby increasing the area where the intersection C is passable.

Taking account of the predicted future vehicle speed, the ECU 32 calculates the remaining distance L to reach the intersection C (stop line). With reference to the set passable boundary PB, the ECU 32 determines according the relationship between the predicted remaining distance L and future vehicle speed whether or not the intersection is passable. When it is determined that the intersection is passable, the ECU 32 terminates the processing concerning this intersection C.

When it is determined that the intersection is not passable, the ECU 32 takes it as a warning wait state, and determines according to the relationship between the predicted remaining distance L and future vehicle speed with reference to the warning condition boundary WB whether or not a warning output is necessary. When it is determined that no warning output is necessary, the ECU 32 repeats the above-mentioned processes after the lapse of a fixed time. When it is determined that the warning output is necessary, the ECU 32 transmits a warning signal to the alarm 20 as mentioned above.

Figure 9:
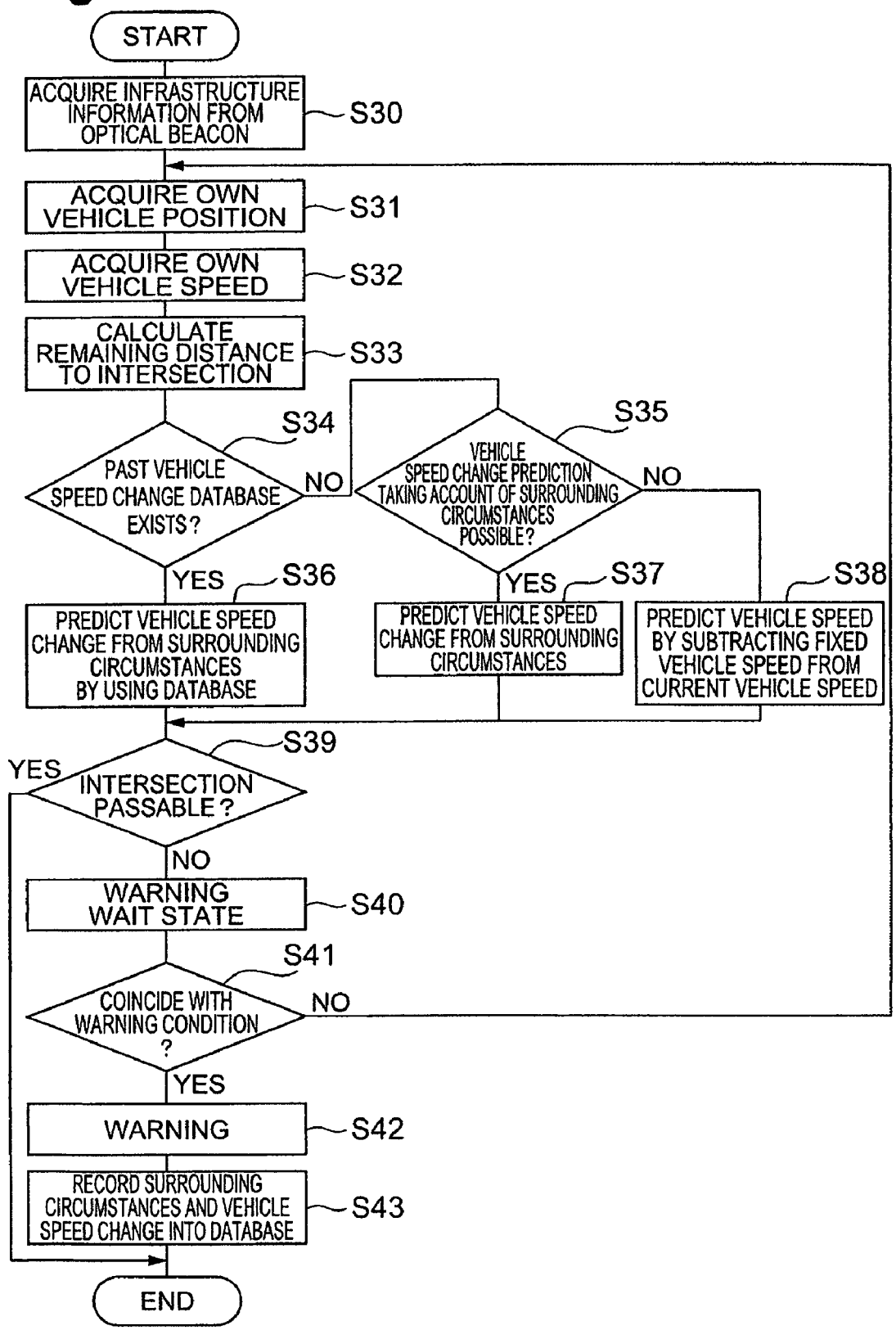
[FIG. 9] is a flowchart illustrating a process flow in an ECU of FIG. 6.

Operations of the signal misrecognition preventing apparatus 2 will now be explained with reference to FIGS. 6 to 8. In particular, the processing in the ECU 32 will be explained along the flowchart of FIG. 9. FIG. 9 is a flowchart illustrating the process flow in the ECU of FIG. 6.

When the own vehicle V enters a downlink area in front of an intersection, as in the first embodiment, the optical beacon receiver 10 transmits the infrastructure information received from the optical beacon B to the ECU 32, whereby the ECU 32 acquires the infrastructure information from the optical beacon receiver 10 (S30). At fixed intervals, the GPS receiver 11 transmits to the ECU 32 the current position calculated according to GPS information received from GPS satellites, and the vehicle speed sensor 12 transmits the detected vehicle speed to the ECU 32. The ECU 32 acquires the current position from the GPS receiver 11 (S31), obtains the vehicle speed from the vehicle speed sensor 12 (S32), and calculates the remaining distance L to the intersection C from the current position and the position of the stop line of the intersection C in the infrastructure information (S33).

The ECU 32 determines whether or not there is the database 32a associating the surrounding circumstances with the past vehicle speed change (i.e., whether or not the vehicle speed change taking account of the past driving behavior of the driver can be predicted) (S34). When it is determined at S34 that there is no database 32a, it is determined whether or not the vehicle speed change taking account of the surrounding circumstances of the own vehicle V, the operating state of the vehicle speed control apparatus, and the like can be predicted (S35).

When it is determined at S34 that the database 32a exists, the ECU 32 predicts a future vehicle speed change in response to the surrounding circumstances of the own vehicle V (road form information, signal cycle information, other vehicle information, etc.) by utilizing the database 32a (S36). Then, the ECU 32 predictably calculates a future vehicle speed by adding the future vehicle speed change to the current vehicle speed (S36).

When it is determined at S35 that the vehicle speed change taking account of the surrounding circumstances and the like can be predicted, the ECU 32 predicts a future vehicle speed change in response to the surrounding circumstances of the own vehicle V (such as road form information), the operating state of the vehicle speed control apparatus (such as ACC apparatus), and the like (S37). Then, the ECU 32 predictably calculates a future vehicle speed change by adding the future vehicle speed change to the current vehicle speed (S37).

When it is determined at S35 that the vehicle speed change taking account of the surrounding circumstances and the like cannot be predicted, the ECU 32 predictably calculates a vehicle speed by subtracting a fixed vehicle speed from the current vehicle speed (S38).

The ECU 32 sets a passable boundary PB according to the future vehicle speed determined by the predictive calculation (S39). Taking account of the predicted future vehicle speed, the ECU 32 calculates the remaining distance (S39). Using the values taking account of the vehicle speed change, the ECU 32 determines according the relationship between the predicted remaining distance L and future vehicle speed with reference to the passable boundary PB whether or not the intersection is passable (S39). When it is determined at S39 that the intersection is passable, the ECU 32 terminates the processing concerning this intersection C.

When it is determined at S39 that the intersection is not passable (the red traffic signal is predicted at the time of entering the intersection), the ECU 32 attains a warning wait state (S40), and determines according to the relationship between the remaining time and future vehicle speed with reference to the warning condition boundary WB whether or not a warning output is necessary (S41). When it is determined at S41 that no warning output is necessary, the ECU 32 returns to S31 after the lapse of a fixed time, so as to repeat the processes mentioned above. When it is determined at S41 that the warning output is necessary, on the other hand, the ECU 32 transmits to the alarm 20 a warning signal for carrying out a warning output with respect to the red traffic light at the time of entering the intersection (S42). Upon receiving the warning signal, the alarm 20 outputs a warning sound or displays a warning image. This warning makes the driver recognize that the intersection is not passable with the red traffic light and immediately perform a braking operation. Further, the ECU 32 records information associating the surrounding circumstances of the own vehicle and the operating state of the vehicle speed control apparatus with the vehicle speed and remaining distance in time series into the database 32a, and terminates the processing concerning this intersection C (S43).

By taking account of a future vehicle speed change based on the past driving behavior of the driver, the signal misrecognition preventing apparatus 2 can predict the remaining distance and remaining time to reach the intersection with a high accuracy, and can determine with a high precision whether or not the intersection is passable. Even when the prediction based on the database 32a is impossible, by taking account of the future vehicle speed change based on the surrounding circumstances or the operating state of the vehicle speed control apparatus, the signal misrecognition preventing apparatus 2 can predict the remaining distance and remaining time to reach the intersection with a high accuracy, and can determine with a high precision whether or not the intersection is passable. As a result, a fine warning determination can be carried out in response to the driving behavior of the driver, the surrounding circumstances, and the like, whereby warnings can be prevented from missing when necessary and erroneously issuing when unnecessary. If only a road state necessary for a prediction is acquired, a vehicle speed change can be predicted from the road state, whereby the vehicle speed change can also be predicted for intersections which have not been passed before or in such circumstances that no other vehicles exist in the surroundings.

By using the vehicle speed obtained by subtracting a fixed vehicle speed from the current vehicle speed, the signal misrecognition preventing apparatus 2 can enhance the safety at the time of passing the intersection even when the prediction based on the database 32a and the prediction based on the surrounding circumstances are impossible. This allows an appropriate warning determination even when the intersection is barely passable so that a warning is issued if the vehicle speed decreases just a little. This can also prevent the vehicle from forcedly entering the intersection when the yellow traffic light is on and evade a dilemma of determining whether or not the intersection is passable and the like.

Figure 10:
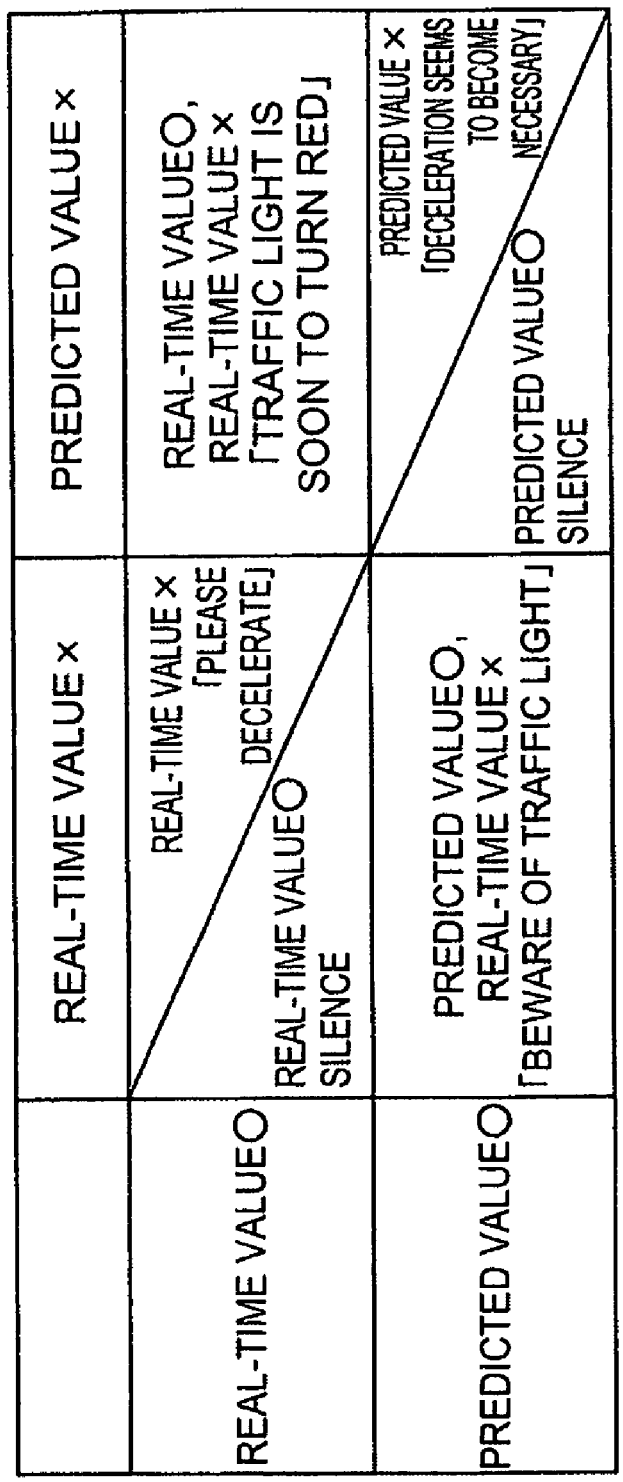
[FIG. 10] is an example of HMI of warning outputs for determining whether or not the intersection is passable by using a real-time vehicle speed value and determining whether or not the intersection is passable by using a predicted vehicle speed change value.

With reference to FIG. 10, HDI (Human Machine Interface) of warning outputs will be considered for a case where the vehicle speed and current position momentarily changing in real time are detected, so as to determine whether or not the intersection is passable according to the vehicle speed and remaining distance (realtime value) and a case where the signal misrecognition preventing apparatus 1 or 2 in accordance with the above-mentioned first or second embodiment predicts the future vehicle speed change and determines whether or not the intersection is passable while taking account of the vehicle speed change (predicted value) in addition to the vehicle speed and remaining distance (real-time value). In FIG. 10, "O" and "X" indicate that the intersection is determined passable and not, respectively.

In the determination using only the real-time value, no warning is issued when the intersection is determined passable, whereas a warning such as "please decelerate" is issued when the intersection is determined not passable.

In the determination using the predicted value as well, no warning is issued when the intersection is determined passable, whereas a warning is issued with a bit softer expression such as "deceleration seems to become necessary."

When the determination using the real-time value and the determination using the predicted value are combined together, warning determinations and warning outputs are performed according to two determination results. When the intersection is determined passable by the real-time value determination but not passable by the predicted value determination, a warning such as "traffic light is soon to turn red" is issued since a decrease in the vehicle speed (deceleration) is predicted by the predicted value determination, so as to urge the driver to stop earlier. When the intersection is determined not passable by the real-time value determination but passable by the predicted value determination, by contrast, a warning such as "beware of traffic light" is issued since an increase in the vehicle speed (acceleration) is predicted by the predicted value determination, so as to urge the driver to pass earlier.

The means for detecting the vehicle speed changing in real time corresponds to the vehicle speed detecting means recited in the claims, the means for determining whether or not the intersection is passable by using only the real-time value corresponds to the second traffic light state predicting means recited in the claims, and the means for carrying out warning determinations and warning outputs by combining the determination using the real-time value and the determination using the predicted value corresponds to the driving assisting means recited in the claims.

Thus, when results of determining whether or not the intersection is passable differ between the determination using the real-time value and the determination using the predicted value (i.e., only one of the determinations predicts a stop signal lit state as the state of the traffic light at the time when the vehicle enters the intersection), the warning level (stopping assistance level) is made lower than that in the case where both of the determinations predict a stop signal lit state as the state of the traffic light at the time when the vehicle enters the intersection. This can prevent warnings from missing, while evading vexation of erroneous warnings, whereby more appropriate warnings can be issued. When both predict a stop signal lit state, a warning is issued with a strong expression such as "traffic light is turning red, so please stop."

Instead of lowering the warning level when results of determining whether or not the intersection is passable differ between the determination using the real-time value and the determination using the predicted value, assistance levels for providing information, calling for attention, and performing braking control such as automatic braking may be lowered when they are effected as stopping assistance, the warning output may be changed to a call for attention, provision of information, or the like, or the braking control may be changed to a warning output or the like.

Figure 11:
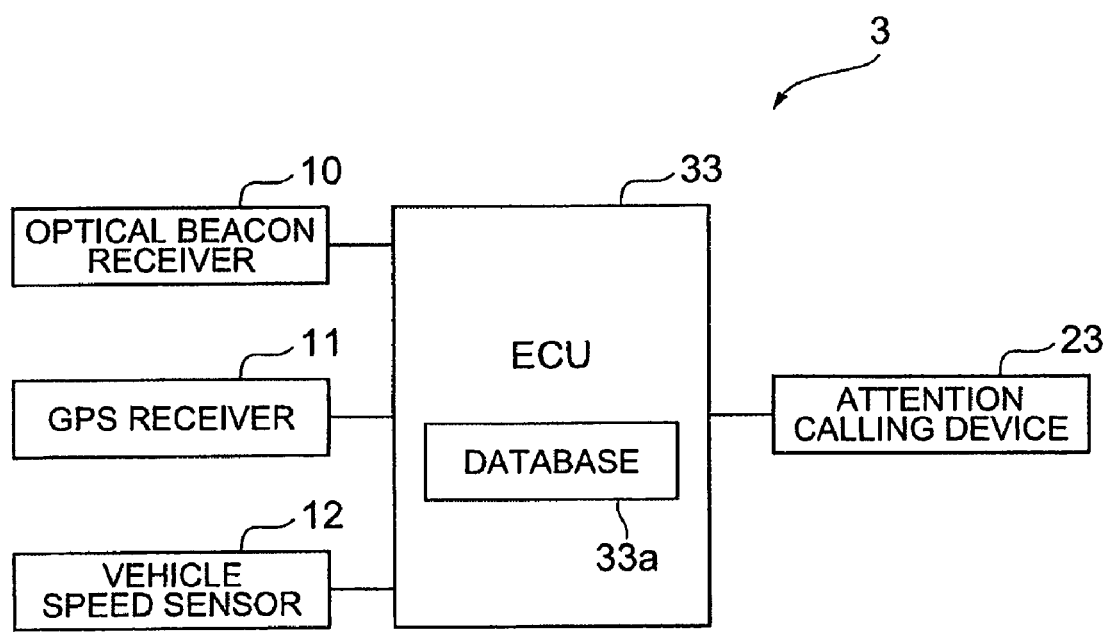
[FIG. 11] is a structural diagram of the signal misrecognition preventing apparatus in accordance with a third embodiment.
Figure 12:
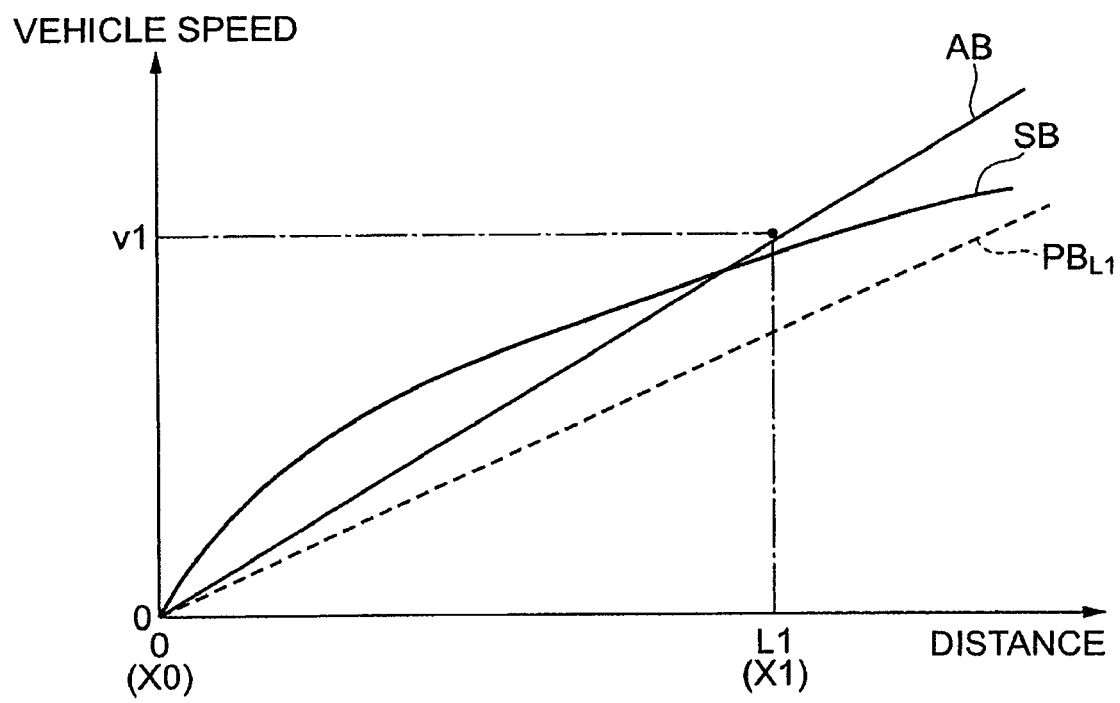
[FIG. 12] is an example of determining a call for attention according to the vehicle speed and remaining distance detected in real time.
Figure 13:
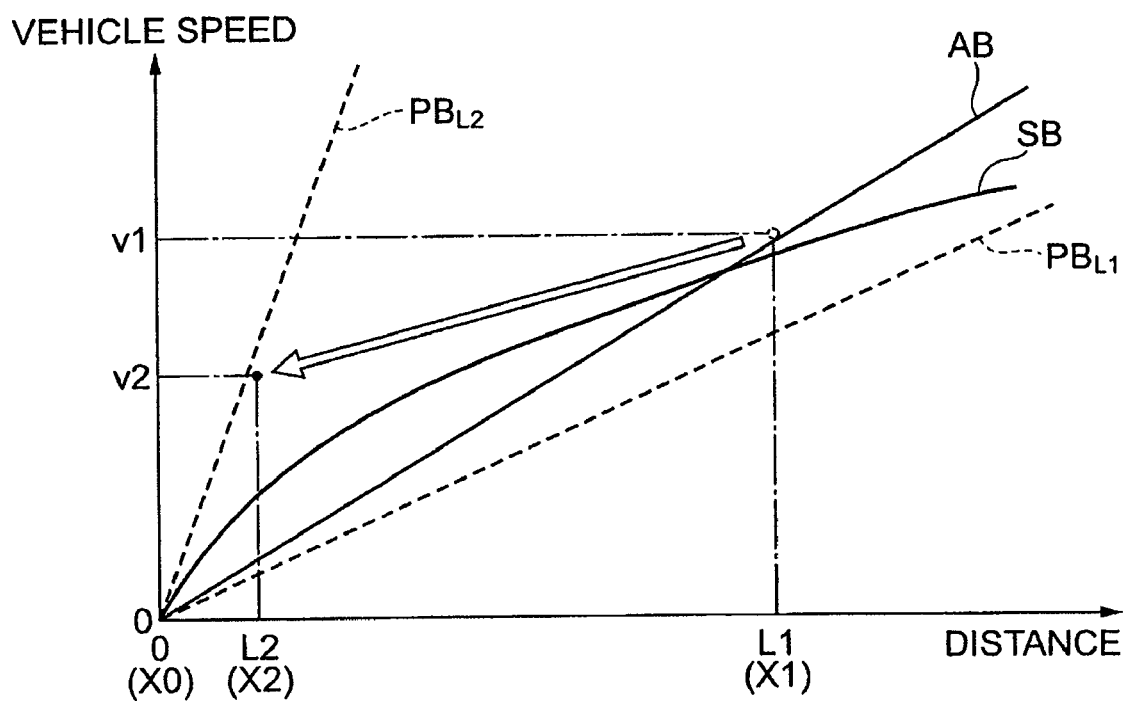
[FIG. 13] is another example of determining a call for attention according to the vehicle speed and remaining distance detected in real time.
Figure 14:
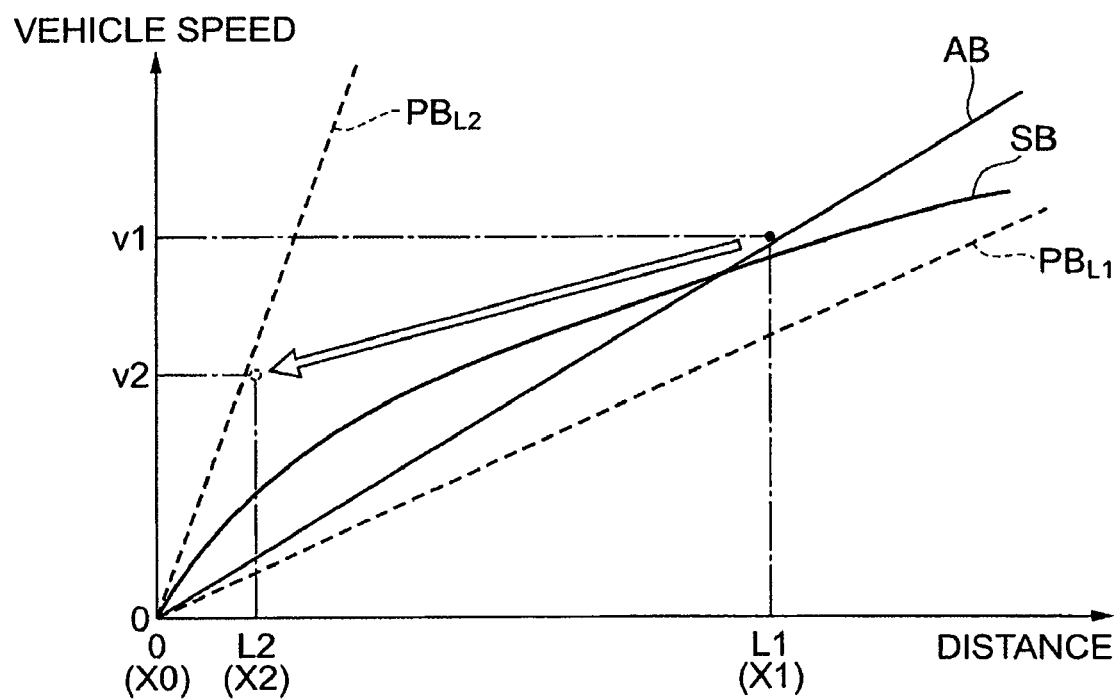
[FIG. 14] is an example of determining a call for attention according to predicted vehicle speed and remaining distance in accordance with the third embodiment.
Figure 15:
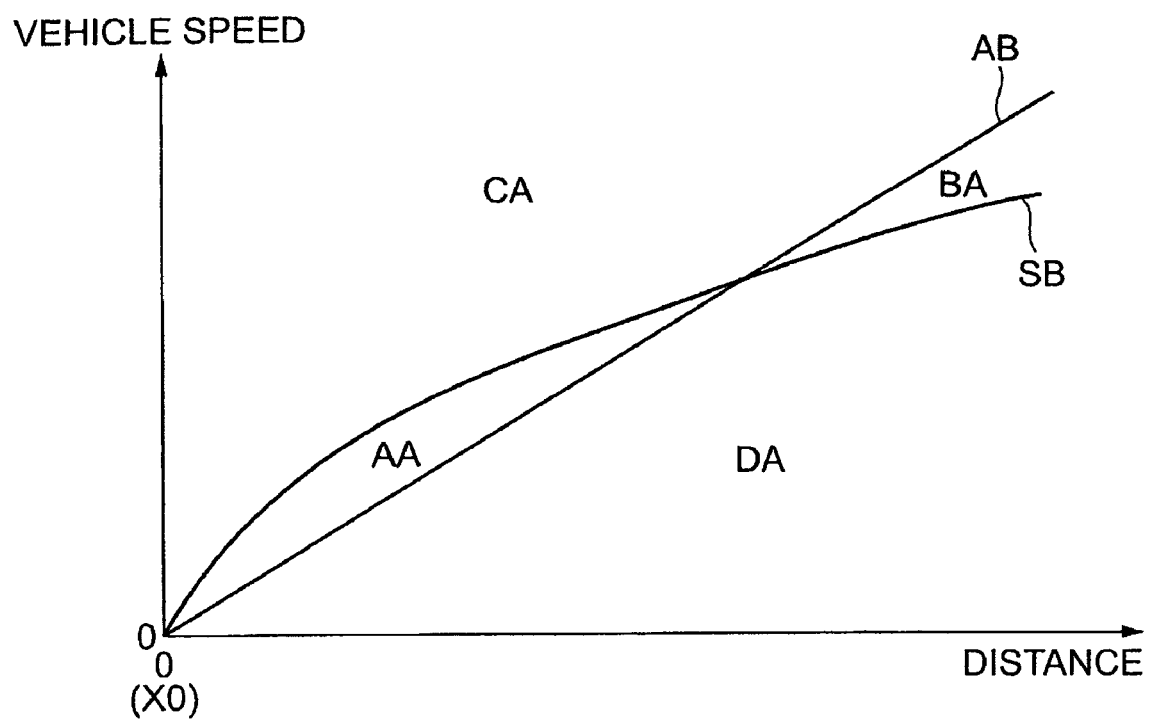
[FIG. 15] is an area determination map for calling for attention according to predicted vehicle speed and remaining distance at the time when a red traffic light begins to turn on in accordance with the third embodiment.

With reference to FIGS. 7, 8, and 11 to 16, the signal misrecognition preventing apparatus 3 in accordance with the third embodiment will be explained. FIG. 11 is a structural diagram of the signal misrecognition preventing apparatus in accordance with the third embodiment. FIG. 12 is an example of determining a call for attention according to the vehicle speed and remaining distance detected in real time. FIG. 13 is another example of determining a call for attention according to the vehicle speed and remaining distance detected in real time. FIG. 14 is an example of determining a call for attention according to predicted vehicle speed and remaining distance at the time when a red traffic light begins to turn on in accordance with the third embodiment. FIG. 15 is an area determination map for calling for attention according to predicted vehicle speed and remaining distance at the time when the red traffic light begins to turn on in accordance with the third embodiment. FIG. 16 is a table listing contents and timings of calls for attention (HMI) corresponding to predicted vehicle speeds and remaining distances in accordance with the third embodiment.

The signal misrecognition preventing apparatus 3 predicts the state of a traffic light when the own vehicle passes an intersection, and calls for attention according to the result of prediction. In particular, the signal misrecognition preventing apparatus 3 predicts a vehicle speed change in response to surrounding circumstances of the own vehicle and a driving behavior intrinsic to the driver, predicts the vehicle speed and remaining distance at the time when the red traffic light begins to turn on while taking account of the vehicle speed change, and determines the content and timing of the call for attention according to the predicted vehicle speed and remaining distance. For this purpose, the signal misrecognition preventing apparatus 3 comprises an optical beacon receiver 10, a GPS receiver 11, a vehicle speed sensor 12, an attention calling device 23, and an ECU 33, while a database 33a is constructed within the ECU 33.

In the third embodiment, processes in the ECU 33 correspond to the vehicle speed change predicting means, traffic light state predicting means, and running state estimating means recited in the claims, the database 33a corresponds to the storage means recited in the claims, and processes in the ECU 33 and the attention calling device 23 correspond to the driving assisting means recited in the claims.

With reference to FIGS. 7 and 12 to 14, a determination of whether or not to call for attention will be explained. In each of FIGS. 12 to 14, the abscissa is the distance (remaining distance) for reaching the intersection C (stop line) from the present, while the ordinate is the vehicle speed of the own vehicle V.

Since the third embodiment calls for attention instead of warning, the warning condition boundary WB used in the first and second embodiments will be referred to as a stoppable boundary SB. As explained above, the passable boundary PB decreases its gradient as the vehicle speed is higher, and increases the gradient as the time passes (i.e., as the own vehicle V approaches the intersection C). The third embodiment further uses an attention calling boundary AB in the ECU 33.

The attention calling boundary AB is a boundary of whether or not a call for attention is necessary. The area on the lower side (right side) of the attention calling boundary AB is usually an area where no call for attention is necessary. The area on the upper side (left side) of the attention calling boundary AB is usually an area where the call for attention is necessary. The attention calling boundary AB is a fixed line corresponding to the remaining distance and vehicle speed, and is set beforehand by an actual running experiment or the like.

FIG. 12 illustrates a case where the current position X1 (remaining distance L1) and vehicle speed v1 of the own vehicle V immediately after downlinking from the optical beacon B are detected as real-time values. Since the relationship between the remaining distance L1 and vehicle speed v1 is located above the attention calling boundary AB, a call for attention is usually necessary. If the own vehicle V keeps the vehicle speed v1, however, the intersection C will be passable since the relationship between the remaining distance L1 and vehicle speed v1 is located above a passable boundary $PB_{L1}$. In this case, it is determined that no call for attention is necessary, so that the driver is not caused to pay attention. However, suppose that the own vehicle V decelerates thereafter as it approaches the intersection C as illustrated in FIG. 13.

FIG. 13 illustrates a case where the current position X2 (remaining distance L2) and vehicle speed v2 (<v1) of the own vehicle V are detected as realtime values when the own vehicle V approaches the intersection C while decelerating from the position X1. Since the relationship between the remaining distance L2 and vehicle speed v2 is located above the attention calling boundary AB, a call for attention is usually necessary. Further, since the gradient of a passable boundary $PB_{L2}$ has become greater as the time passes, the relationship between the remaining distance L2 and vehicle speed v2 is located below the passable boundary $PB_{L2}$, so that the intersection C is not passable (the red traffic light is on when the own vehicle V enters the intersection). Though it is determined that a call for attention is necessary in this case, the calling for attention is useless. That is, the own vehicle V is so close to the intersection C that the own vehicle V cannot stop at the stop line of the intersection C even if the driver carries out a braking operation after the calling for attention.

Therefore, it is necessary to call for attention at a timing before such a state occurs, so that the own vehicle V can safely stop at the stop line of the intersection C. Hence, a future vehicle speed change is predicted by the predicting method in accordance with the second embodiment, so as to be utilized. That is, according to the future vehicle speed change, the remaining distance and vehicle speed of the own vehicle V at the time when the red traffic light begins to turn on is predicted together with a passable boundary PB, and whether or not the own vehicle V can pass the intersection C is determined according to the relationship between the predicted remaining distance and vehicle speed of the own vehicle V and the passable boundary PB. When it is determined that the intersection C is passable, the content and timing of the call for attention corresponding to the relationship between the predicted vehicle speed and remaining distance are determined, and the calling for attention is invoked beforehand.

FIG. 14 illustrates a case where the current position X1 (remaining distance L1) and vehicle speed v1 of the own vehicle V immediately after downlinking from the optical beacon B are detected as realtime values, while the position X2 (remaining distance L2) and vehicle speed v2 of the own vehicle V and a passable boundary $PB_{L2}$ after the lapse of a fixed time are predicted according to the future vehicle speed change. As in the example illustrated in FIG. 12, it is determined that no call for attention is necessary in the relationship between the remaining distance L1 and vehicle speed v1 that are real-time values. However, the relationship between the remaining distance L2 and vehicle speed v2 that are predicted values is located below the predicted passable boundary $PB_{L2}$, so that it is determined that the intersection C is not passable (the red traffic light is on when the own vehicle V enters the intersection). In this case, the content (HMI) and timing of the call for attention are determined by the relationship between the remaining distance L2 and vehicle speed v2 that are predicted values, and a call for attention is invoked before the own vehicle V actually reaches the position X2. This call for attention makes the driver perform a braking operation, so that the own vehicle V can safely stop at the stop line of the intersection C.

The attention calling device 23, which is a device for outputting a call for attention informing that the red traffic light is predicted when the own vehicle enters the intersection, outputs a sound, displays an image, and so forth. Upon receiving an attention calling signal from the ECU 33, the attention calling device 23 outputs a sound or displays an image in response to the attention calling signal.

The ECU 33, which is an electronic control unit constructed by a CPU, a ROM, a RAM, and the like, controls the signal misrecognition preventing apparatus 3 as a whole. The ECU 33 receives respective information items from the optical beacon receiver 10, GPS receiver 11, and vehicle speed sensor 12 at fixed intervals, executes processes according to these information items and the information stored in the database 33a, and transmits an attention calling signal to the attention calling device 20 when it is determined that a call for attention is necessary. The database 33a is one similar to the database 32a in accordance with the second embodiment.

The respective processes in the ECU 33 for calculating the remaining distance, predicting the vehicle speed change, predicting the future vehicle speed, and determining according to the passable boundary PB whether or not the intersection is passable are similar to those in the ECU 32 and thus will not be explained. The gradient of the future passable boundary $PB_{L2}$ is set while taking account of the time elapsed in addition to the future vehicle speed.

When it is determined that the intersection is passable, the ECU 33 determines it unnecessary to call for attention.

When it is determined that the intersection is not passable, the ECU 33 determines it necessary to call for attention. At intervals of time elapsed from when downlinking from the optical beacon B, the ECU 33 sequentially predicts the future vehicle speeds and positions (remaining distances) and sequentially sets future passable boundaries PB according to the predicted vehicle speed change. That is, the future vehicle speed and remaining distance and the passable boundary PB are predicted while assuming that time elapses by fixed increments (very short periods) after downlinking (the own vehicle V gradually approaches the intersection C). At each time elapsed, the ECU 33 compares the future vehicle speed and remaining position with the passable boundary PB, and searches for a point of time at which the position of the future vehicle speed and remaining distance is located on the passable boundary PB (i.e., the vehicle speed and remaining distance of the own vehicle V at the point of time when the red traffic light begins to turn on). When the point of time at which the position of the future vehicle speed and remaining distance is located on the passable boundary PB can be searched for, the ECU 33 stores the future vehicle speed and remaining distance at this point of time. According to the future vehicle speed and remaining distance at the time when the red traffic light begins to turn on, the ECU 33 determines the content (HMI) and timing of the call for attention.

First, as this determining method, the ECU 33 refers to the area determination map illustrated in FIG. 15 and determines an area corresponding to the relationship between the future vehicle speed and remaining distance. That is, an area is determined where the own vehicle V will enter at the point of time when the red traffic light begins to turn on after the lapse of a fixed time, if it is assumed to run with the predicted vehicle speed change. This area determination map is a map dividing the relationship between the vehicle speed and remaining distance into four areas AA, BA, CA, and DA according to the stoppable boundary SB and attention calling boundary AB. The area AA is an area which is below the stoppable boundary SB (where the own vehicle V can stop at the stop line of the intersection C) and above the attention calling boundary AB (where a call for attention is necessary). The area BA is an area which is above the stoppable boundary SB (where the own vehicle V cannot stop at the stop line of the intersection C) and below the attention calling boundary AB (where no call for attention is necessary). The area CA is an area which is above the stoppable boundary SB (where the own vehicle V cannot stop at the stop line of the intersection C) and above the attention calling boundary AB (where a call for attention is necessary). The area DA is an area which is below the stoppable boundary SB (where the own vehicle V can stop at the stop line of the intersection C) and below the attention calling boundary AB (where no call for attention is necessary).

Next, the ECU 33 refers to a table listing the contents (HMI) and timings of calls for attention illustrated in FIG. 16, and determines the content (HMI) and timing of a call for attention corresponding to an area where the vehicle is predicted to enter at the point of time when the red traffic light begins to turn on. When the vehicle is predicted to enter the area AA, the point of time at which the relationship between the actual vehicle speed v1 and remaining distance L passes the attention calling boundary AB is taken as a timing of the call for attention so that the vehicle is kept from entering the area AA as much as possible, and attention is called for with the content of "beware: traffic light is turning red." When the vehicle is predicted to enter the area BA, the point of time at which the relationship between the actual vehicle speed v1 and remaining distance L passes the stoppable boundary SB is taken as a timing of the call for attention so that it does not surpass the stoppable boundary SB and becomes unstoppable, and attention is called for with the content of "please decelerate: traffic light is turning red." When the vehicle is predicted to enter the area CA, a point of time immediately after downlinking from the optical beacon B is taken as a timing of the call for attention so that it does surpass the stoppable boundary SB and becomes unstoppable, and attention is called for with the content of "beware of traffic light!" When the vehicle is predicted to enter the area DA, which is an area with a margin, the point of time at which the yellow traffic light begins to turn on is taken as a timing of the call for attention, and attention is called for with the content of "traffic light is soon to become red" as provision of information or the like.

After determining the content and timing of the call for attention, the ECU 33 determines whether or not the determined timing is attained. When the determined timing is attained, the ECU 33 generates an attention calling sound or attention calling image in response to the determined content, and transmits it as an attention calling signal to the attention calling device 23.

Operations of the signal misrecognition preventing apparatus 3 will now be explained with reference to FIGS. 14 to 16. In particular, the processing in the ECU 33 will be explained along the flowchart of FIG. 17. FIG. 17 is a flowchart illustrating the process flow in the ECU of FIG. 11.

Since the signal misrecognition preventing apparatus 3 carries out operations (processes of S50 to S59 in the ECU 33 in particular) up to determining whether or not the intersection is passable as with the signal misrecognition preventing apparatus 2 in accordance with the second embodiment (processes of S30 to S39 in the ECU 32 in particular), they will not be explained.

When it is determined at S59 that the intersection is passable, the ECU 33 terminates the processing concerning this intersection C. When it is determined at S59 that the intersection is not passable (the red traffic light is predicted at the time of entering the intersection), on the other hand, the ECU 33 predictably calculates the vehicle speed and remaining distance of the own vehicle V at the time when the red traffic light begins to turn on according to the predicted future vehicle speed change (S60). Then, the ECU 33 determines the content and timing of the call for attention in response to the predicted vehicle speed and remaining distance (S61).

At fixed intervals, the ECU 33 determines whether or not the determined attention calling timing is attained (S62). When it is determined that the attention calling timing is attained, the ECU 33 transmits an attention calling signal for outputting the determined content of the call for attention to the attention calling device 23 (S62). Upon receiving the attention calling signal, the attention calling device 23 outputs a sound or displays an image with the determined content of the call for attention. This call for attention makes the driver recognize that the intersection is not passable with the red traffic light and perform a braking operation. Further, the ECU 33 records information associating the surrounding circumstances of the own vehicle V and the operating state of the vehicle speed control apparatus with the vehicle speed and remaining distance in time series into the database 33a, and terminates the processing concerning this intersection C (S63).

By setting the content and timing of the call for attention in response to the vehicle speed and remaining distance at the time when the red traffic light begins to turn on that are predicted according to the future vehicle speed change in the case where the red traffic light is predicted at the time of entering the intersection, the signal misrecognition preventing apparatus 3 can call for attention at an appropriate timing beforehand with an appropriate content. As a result, the driver can perform a braking operation at an appropriate timing, so that the own vehicle can safely stop at the stop line of the intersection.

While the embodiments in accordance with the present invention have been explained in the foregoing, the present invention can be carried out in various modes without being restricted to the above-mentioned embodiments.

For example, though the above-mentioned embodiments are applied to signal misrecognition preventing apparatus, the present invention may be built into a driving assisting apparatus or automatic driving apparatus which performs other kinds of driving assistance as well and the like.

Though the above-mentioned embodiments are constructed such as to issue a warning by outputting a sound or displaying an image to the driver when the vehicle is predicted to enter the intersection with the red traffic light, other kinds of control such as automatic braking may be carried out.

Though the above-mentioned embodiments are constructed such as to acquire signal cycle information, road form information, and the like by receiving information from the optical beacon, they may be acquired by other methods.

Though the above-mentioned embodiments are constructed such as to acquire the current position of the own vehicle by receiving information from the GPS, it may be acquired by other methods.

Though the above-mentioned embodiments are constructed such as to terminate the processing once a warning is issued, the determination may be continued after issuing the warning and, when the result of determination changes, a warning may be issued again in response to the changed result of determination.

Though the above-mentioned embodiments are constructed such as to determine whether or not the vehicle can safely stop at the intersection with the warning condition boundary after determining whether or not the intersection is passable with the passable boundary as a determination of whether or not to output a warning, the determination with the passable boundary may be carried out alone as a determination of whether or not to output a warning.

Though the first embodiment is constructed such as to perform a determination according to the degree of acceleration/deceleration predicted from the vehicle speed change between the present and the past in the case of the normal warning determination, other determining methods such as a determination by only the current vehicle speed and remaining distance detected in real time may be employed.

Though the first embodiment is constructed such as to assume a driver who temporarily accelerates in front of the intersection, some drivers may wish to pass with the green traffic light so much as to accelerate until passing the intersection, while others may change behaviors depending on whether the traffic light changes from green to yellow until the passing zone ends (accelerate so as to be able to pass the intersection when the traffic light turns yellow; otherwise, drive as usual). Even in such a case, more effective systems can be embodied by switching predicting methods in conformity to the driver type.

Though the second embodiment is constructed such as to include the database within the ECU, it may be provided on the outside of the ECU, or a database may be located in a base station or the like, so as to transmit/receive information through communications.

Though the second embodiment is constructed such as to acquire the surrounding circumstances of the own vehicle by downlink information from the optical beacon, they may be acquired by other methods. For example, road slope information may be acquired by a slope sensor, positions and vehicle speeds of other vehicles may be acquired by sensors for detecting other vehicles, and information of other vehicles may be acquired by vehicle-to-vehicle communications.

Though the third embodiment employs the predicting method in accordance with the second embodiment, other predicting methods such as the predicting method in accordance with the first embodiment may be employed.

Though the third embodiment is constructed such as to determine the content and timing of the call for attention according to the predicted remaining distance (vehicle position) and vehicle speed; when carrying out stopping assistance other than the call for attention, the content of a warning, the content of vehicle control such as automatic braking or assisted braking, and the like may be determined according to running conditions such as the predicted remaining distance and vehicle speed, or stopping assistance such as vehicle control (braking control), warning outputs, calls for attention, and provision of information may be changed stepwise.

Though the third embodiment represents an example of contents and timings for calls for attention concerning four areas according to the relationship between the vehicle speed and remaining distance, these contents and timings can be set arbitrarily. Though attention is called for all of the four areas, provision of information or the like may be omitted. The areas may be divided in other ways as well.

Though the third embodiment is constructed such as to change the content and timing of the call for attention, the content of the call for attention may be changed alone.

The invention claimed is:

1. A driving assisting apparatus for predicting a state of a traffic light when a vehicle enters an intersection, the apparatus comprising:

a vehicle speed change predictor to predict a vehicle speed change of the vehicle in front of the intersection;
a first traffic light state predictor to predict the state of the traffic light when the vehicle enters the intersection according to the vehicle speed change predicted by the vehicle speed change predictor;
a vehicle speed detector to detect a vehicle speed;
a second traffic light state predictor to predict a state of the traffic light when the vehicle enters the intersection according to the vehicle speed detected by the vehicle speed detector; and
a driving assister to assist driving according to the state of the traffic light predicted by the traffic light state predictor and the state of the traffic light predicted by the second traffic light state predictor.

2. The driving assisting apparatus according to claim 1, further comprising a storage medium to store a characteristic concerning a past vehicle speed change of a driver of the vehicle in front of the intersection in association with a running environment;
wherein the vehicle speed change predictor predicts the vehicle speed change of the vehicle according to information stored in the storage medium.

3. The driving assisting apparatus according to claim 1, wherein the vehicle speed change predictor changes a basis of the prediction of the vehicle speed change depending on whether or not the vehicle is positioned in front of a predetermined area set in front of the intersection.

4. The driving assisting apparatus according to claim 1, wherein the driving assistor assists stopping when at least one of the state of the traffic light predicted by the traffic light state predictor and the state of the traffic light predicted by the second traffic light state predictor is a stop signal lit state, and wherein a content of the stopping assistance is changed depending on whether or not both of the state of the traffic light predicted by the traffic light state predictor and the state of the traffic light predicted by the second traffic light state predictor are the stop signal lit state.

5. A driving assisting method for predicting a state of a traffic light when a vehicle enters an intersection, the method comprising:
predicting a vehicle speed change of the vehicle in front of the intersection;
first predicting the state of the traffic light when the vehicle enters the intersection according to the vehicle speed change predicted by the vehicle speed change predicting step;
detecting a vehicle speed;
second predicting a state of the traffic light when the vehicle enters the intersection according to the detecting step; and
assisting driving according to the first state of the traffic light predicting step and the second state of the traffic light predicting step.

6. The driving assisting method according to claim 5, further comprising storing a characteristic concerning a past vehicle speed change of a driver of the vehicle in front of the intersection in association with a running environment; wherein
the vehicle speed change predicting step predicts the vehicle speed change of the vehicle according to information stored in the storing step.

7. The driving assisting method according to claim 5, wherein the vehicle speed change predicting step changes a basis of the prediction of the vehicle speed change depending on whether or not the vehicle is positioned in front of a predetermined area set in front of the intersection.

8. The driving assisting method according to claim 5, wherein the driving assisting step assists stopping when at least one of the state of the traffic light predicted in the first traffic light state predicting step and the state of the traffic light predicted in the second traffic light state predicting step is a stop signal lit state, and wherein a content of the stopping assistance is changed depending on whether or not both of the state of the traffic light predicted in the first traffic light state predicting step and the state of the traffic light predicted in the second traffic light state predicting step are the stop signal lit state.

9. A driving assisting apparatus according to claim 2, wherein the driving assistor assists stopping when the state of the traffic light predicted by the first traffic light state predictor is a stop signal lit state, the driving assisting apparatus further comprising:
- a running state estimator to estimate a running state of the vehicle at a point of time when the first traffic light state predictor predicts the stop signal lit state according to the vehicle speed change predicted by the vehicle speed change predictor,
- wherein the driving assistor changes a content of the stopping assistance according to the running state estimated by the running state estimator.

10. The driving assisting apparatus according to claim 3, wherein the driving assistor assists stopping when the state of the traffic light predicted by the first traffic light state predictor is a stop signal lit state, the driving assisting apparatus further comprising:
- running state estimator to estimate a running state of the vehicle at a point of time when the first traffic light state predictor predicts the stop signal lit state according to the vehicle speed change predicted by the vehicle speed change predictor,
- wherein the driving assistor changes a content of the stopping assistance according to the running state estimated by the running state estimator.

11. A driving assisting method according to claim 6, wherein the driving assisting step assists stopping when the state of the traffic light predicted in the first traffic light state predicting step is a stop signal lit state, the driving assisting method further comprising:
- a running state estimating step of estimating a running state of the vehicle at a point of time when the first traffic light state predicting step predicts the stop signal lit state according to the vehicle speed change predicted in the vehicle speed change predicting step,
- wherein the driving assisting step changes a content of the stopping assistance according to the running state estimated in the running state estimating step.

12. A driving assisting method according to claim 7, wherein the driving assisting step assists stopping when the state of the traffic light predicted in the first traffic light state predicting step is a stop signal lit state, the driving assisting method further comprising:
- a running state estimating step of estimating a running state of the vehicle at a point of time when the first traffic light state predicting step predicts the stop signal lit state according to the vehicle speed change predicted in the vehicle speed change predicting step,
- wherein the driving assisting step changes a content of the stopping assistance according to the running state estimated in the running state estimating step.

* * * * *